United States Patent
Kani et al.

(10) Patent No.: US 10,872,159 B2
(45) Date of Patent: Dec. 22, 2020

(54) APPARATUS AND SYSTEM FOR INFORMATION PROCESSING

(71) Applicant: FUJITSU LIMITED, Kawasaki (JP)

(72) Inventors: Junya Kani, Kawasaki (JP); Hidenobu Ito, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 26 days.

(21) Appl. No.: 15/684,107

(22) Filed: Aug. 23, 2017

(65) Prior Publication Data
US 2018/0089446 A1   Mar. 29, 2018

(30) Foreign Application Priority Data

Sep. 29, 2016  (JP) ................... 2016-191968

(51) Int. Cl.
*H04L 29/06*   (2006.01)
*G06F 21/60*   (2013.01)
(Continued)

(52) U.S. Cl.
CPC ............ *G06F 21/604* (2013.01); *G06F 21/53* (2013.01); *G06F 21/60* (2013.01); *G06F 21/57* (2013.01); *G06F 2221/031* (2013.01)

(58) Field of Classification Search
CPC ........................................................ G06F 21/00
See application file for complete search history.

(56) References Cited

U.S. PATENT DOCUMENTS

| | | | | |
|---|---|---|---|---|
| 5,870,467 A | * | 2/1999 | Imai ................... | G06F 9/468 705/57 |
| 6,790,178 B1 | * | 9/2004 | Mault ................ | A61B 5/02055 600/300 |

(Continued)

FOREIGN PATENT DOCUMENTS

| | | |
|---|---|---|
| JP | 4333973 | 11/1992 |
| JP | 10275106 | 10/1998 |

(Continued)

OTHER PUBLICATIONS

Notice of Reasons for Refusal, dated Sep. 30, 2020, in Japanese Application No. 2016-191968 (7 pp.).

(Continued)

*Primary Examiner* — Taghi T Arani
*Assistant Examiner* — Lin Chang
(74) *Attorney, Agent, or Firm* — Staas & Halsey LLP

(57) ABSTRACT

An apparatus, for information processing, is configured to execute an embedding process that includes finding equipment based on equipment information described as an attribute of an input field of a form screen and dynamically embedding an equipment control module corresponding to the equipment, execute a data acquisition process that includes acquiring data from the equipment by using the equipment control module as input data to the input field of the form screen, and execute an information output process that includes associating the data acquired from the equipment with an input field descriptor to identify the input field and storing the data in a first storage area and a second storage area, wherein the first storage area is a storage area in which editing of stored data is possible and the second storage area is a storage area in which editing of stored data is prohibited.

11 Claims, 30 Drawing Sheets

(51) Int. Cl.
*G06F 21/53* (2013.01)
*G06F 21/57* (2013.01)

(56) References Cited

U.S. PATENT DOCUMENTS

| | | | |
|---|---|---|---|
| 9,990,678 B1* | 6/2018 | Cabrera | G06Q 40/123 |
| 10,203,968 B1* | 2/2019 | Lawson | G06F 9/44521 |
| 2002/0060702 A1 | 5/2002 | Sugimoto et al. | |
| 2002/0077730 A1 | 6/2002 | Hardtle et al. | |
| 2013/0311104 A1 | 11/2003 | Inoue | |
| 2003/0233558 A1* | 12/2003 | Lieberman | G06F 9/4416 713/189 |
| 2004/0215972 A1* | 10/2004 | Sung | H04L 63/1408 726/23 |
| 2006/0182133 A1* | 8/2006 | Choumaru | H04L 45/745 370/401 |
| 2007/0173726 A1* | 7/2007 | Kim | A61B 5/02241 600/483 |
| 2011/0004738 A1* | 1/2011 | Yasaki | G06F 3/0623 711/166 |
| 2011/0060754 A1* | 3/2011 | Theimer | H04M 1/7255 707/769 |
| 2011/0283115 A1* | 11/2011 | Junod | H04L 9/0631 713/190 |
| 2011/0296192 A1* | 12/2011 | Hayashi | G06F 12/1441 713/180 |
| 2013/0013525 A1* | 1/2013 | Dlott | G06Q 30/02 705/318 |
| 2013/0211265 A1 | 8/2013 | Bedingham et al. | |
| 2013/0259228 A1* | 10/2013 | Ren | H04L 63/123 380/200 |
| 2014/0156990 A1* | 6/2014 | Dare | H04L 63/0823 713/156 |
| 2014/0325239 A1* | 10/2014 | Ghose | G06F 9/3851 713/190 |
| 2015/0186645 A1* | 7/2015 | Aziz | H04L 63/1433 726/23 |
| 2015/0207706 A1* | 7/2015 | Li | H04L 67/02 709/224 |
| 2015/0371034 A1* | 12/2015 | Miller | G06F 21/31 726/17 |
| 2017/0046211 A1* | 2/2017 | Jayawardena | G06F 9/45512 |
| 2017/0329759 A1* | 11/2017 | Fujioka | G06F 40/174 |

FOREIGN PATENT DOCUMENTS

| | | | | |
|---|---|---|---|---|
| JP | 2002163356 A | 6/2002 | | |
| JP | 2002-267576 | 9/2002 | | |
| JP | 2004-85239 | 3/2004 | | |
| JP | 2009-151610 | 7/2009 | | |
| JP | 2014502172 A | 1/2014 | | |
| RU | 2239244 C2 * | 10/2004 | | G06F 12/0246 |
| WO | WO2012127887 A1 | 9/2012 | | |

OTHER PUBLICATIONS

Notice of Reasons for Refusal, dated Jul. 21, 2020, in Japanese Application No. 2016191968 (12 pp.).
Notice of Reasons for Refusal, dated Oct. 6, 2020, in Japanese Application No. 2016-191968 (7 pp.).

* cited by examiner

FIG. 3

```
                                                           510-1
   {
510-2  {"did" : "/wscale",        // IDENTIFIER OF WEIGHT SCALE
510-3   "scan" : {
           "type": "ble",         // TYPE OF WIRELESS SYSTEM
510-4  {   "uuid_16": ["0x181d"]  // UUID THAT REPRESENTS WEIGHT SCALE
        },
510-5  {"driver" : "http://lexample.com/driver?name=wscale" } // ACQUISITION
       DESTINATION OF DRIVER
        },
```

FIG. 7

```
                 ┌─ 71
┌────────────────────────────────────────────────────┐
│ PROTECTED INFORMATION :                            │
│ 71-1 ─── { id: 0123,          // IDENTIFIER OF PROTECTED INFORMATION
│ 71-2 ─── { data: "85",        // DATA
│ 71-3 ─── { deviceId: "wscale",// EQUIPMENT DESCRIPTOR
│ 71-4 ─── { inputId: "weight", // INPUT FIELD DESCRIPTOR
│ 71-5 ─── { trust: TrustObject,// TRUSTWORTHINESS
└────────────────────────────────────────────────────┘
```

FIG. 8

| ID | DATA | EQUIPMENT DESCRIPTOR | INPUT FIELD DESCRIPTOR | TRUSTWORTHINESS | |
|---|---|---|---|---|---|
| 0123 | 85 | wscale | Weight | A | } 81 |
| 0124 | 365 | temp | Temp | X | } 82 |

```
                  280
      PROTECTED INFORMATION : {
71-1 ──{ id: 0123, // IDENTIFIER OF PROTECTED INFORMATION
71-2 ──{ data: "85", // DATA
71-3 ──{ deviceId: "wscale", // EQUIPMENT DESCRIPTOR
71-4 ──{ inputId: "weight", // INPUT FIELD DESCRIPTOR
71-5 ──{ trust: TrustObject, // TRUSTWORTHINESS
280-1──{ addId: "Ledger001", // APPLICATION IDENTIFIER
280-2──{ userId: "kani.device1", // TERMINAL IDENTIFIER
280-3──{ date: "2016/03/03 hh:mm:ss", // ACQUISITION DATE AND TIME
280-4──{ place: "S603", // ACQUISITION PLACE
280-5──{ url: "http://iot.platform/data/wscale/api/_past/-.json"
      }
```

| ID | INPUT FIELD DESCRIPTOR | EQUIPMENT DESCRIPTOR | APPLICATION IDENTIFIER | DATA | ACQUISITION PLACE | TERMINAL IDENTIFIER | ACQUISITION DATE AND TIME | URI | TRUST-WORTHINESS |
|---|---|---|---|---|---|---|---|---|---|
| 0001 | Weight | wscale | weight | 25 | S603 | 100 | S603 | http://example.com/?id=1 | 70 |
| 0123 | Input1 | Dev1 | input1 | 32 | S604 | 101 | S604 | http://example.com/?id=2 | 50 |

APPARATUS AND SYSTEM FOR INFORMATION PROCESSING

CROSS-REFERENCE TO RELATED APPLICATION

This application is based upon and claims the benefit of priority of the prior Japanese Patent Application No. 2016-191968, filed on Sep. 29, 2016, the entire contents of which are incorporated herein by reference.

FIELD

The embodiments discussed herein are related to an apparatus and a system for information processing.

BACKGROUND

In recent years, there has been an automation technique of data input in which measurement values obtained by measurement by various kinds of equipment are reflected in a form by digitalization of the equipment used in factories and medical sites.

Furthermore, contrivance for suppressing falsification of an input measurement value is made. For example, there is the following technique. Location information and date-and-time information when a measurement value is input to a form are automatically described in the form to suppress fraudulent editing of the form at a different place and at different date and time.

Examples of the related art include Japanese Laid-open Patent Publication No. 2004-085239, Japanese Laid-open Patent Publication No. 2009-151610, and Japanese Laid-open Patent Publication No. 2002-267576.

SUMMARY

According to an aspect of the embodiments, an apparatus for information processing includes: a memory; and a processor coupled to the memory and configured to execute an embedding process that includes finding equipment based on equipment information described as an attribute of an input field of a form screen and dynamically embedding an equipment control module corresponding to the equipment, execute a data acquisition process that includes acquiring data from the equipment by using the equipment control module as input data to the input field of the form screen, and execute an information output process that includes associating the data acquired from the equipment with an input field descriptor to identify the input field and storing the data in a first storage area and a second storage area, wherein the first storage area is a storage area in which editing of stored data is possible and the second storage area is a storage area in which editing of stored data is prohibited.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram for explaining an equipment information database of the first embodiment;

FIG. 7 is a diagram illustrating one example of a description that represents protected information of the first embodiment;

FIG. 8 is a diagram illustrating one example of a protected information storing unit of the first embodiment;

FIG. 28 is a diagram for explaining protected information of the second embodiment;

FIG. 29 is a diagram illustrating one example of a protected information storing unit of the second embodiment.

DESCRIPTION OF EMBODIMENTS

If editing of input data is prohibited in automation of data input, this is often inconvenient when incorrect data is input due to an operation error or the like, for example. However, if editing of input data is permitted, there is a possibility that verification of falsification of data becomes difficult.

As one aspect of the present embodiments, provided are techniques for verifying whether or not falsification exists.

First Embodiment

Figure 1:
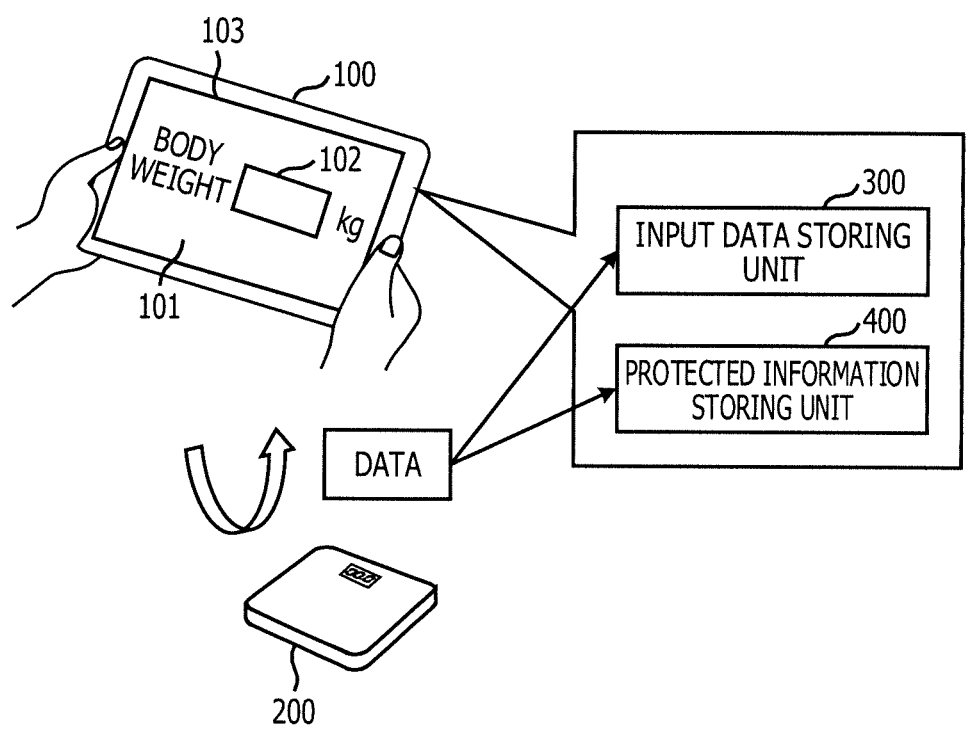
FIG. 1 is a diagram for explaining outline of a first embodiment.

A first embodiment will be described below with reference to the drawings. FIG. 1 is a diagram for explaining outline of the first embodiment.

A terminal apparatus 100 of the present embodiment records input data in two storage areas simultaneously and allows later verification of whether data editing is proper even after the recorded data is edited. The two storage areas are a storage area in which editing of the recorded data is possible and a storage area in which editing of the recorded data is prohibited.

The terminal apparatus 100 of the present embodiment implements the above-described processing by a form program installed on the terminal apparatus 100.

In the example of FIG. 1, an input screen 101 of a form type is displayed on the terminal apparatus 100 and the input screen 101 includes an input field 102 to which data measured by utilization equipment 200 is input. Furthermore, in the example of FIG. 1, the utilization equipment 200 is a weight scale.

Therefore, in the input screen 101, a body weight measured by the utilization equipment 200 is input to the input field 102 as data.

Here, in the present embodiment, when data measured by the utilization equipment 200 is input to the input field 102, the data is individually stored in an input data storing unit 300 and a protected information storing unit 400.

For example, if a protection specifier with which input data is deemed as a protection subject is described in screen definition information that defines the input screen 101, the terminal apparatus 100 stores data input to the input field 102 in the input data storing unit 300 and the protected information storing unit 400.

The input data storing unit 300 is a storage area in which editing of stored data is possible and the protected information storing unit 400 is a storage area in which editing of stored data is impossible.

In the input data storing unit 300, at least an input field descriptor to identify the input field 102 and data that is input are stored as input data. Furthermore, in the protected information storing unit 400, at least the input field descriptor to identify the input field 102, data that is input, and the trustworthiness of the data are stored as protected information.

In the present embodiment, as described above, input data is stored in both the input data storing unit 300 in which data after storing is editable and the protected information storing unit 400 in which editing of data after storing is impossible. Therefore, in the present embodiment, whether or not falsification after storing of data exists may be verified by comparing pieces of data stored in the respective storing units.

Note that, although the example in which a weight scale is employed as the utilization equipment 200 is represented in FIG. 1, the utilization equipment is not limited thereto.

Furthermore, in the present embodiment, data measured by the utilization equipment 200 may be automatically input to the input field 102 from the utilization equipment 200.

In the terminal apparatus 100 of the present embodiment, the form program includes an equipment descriptor to identify the utilization equipment 200.

The terminal apparatus 100 of the present embodiment detects the existence of the utilization equipment 200 based on equipment information of the utilization equipment 200 obtained from this equipment descriptor and acquires and embeds an equipment control module of the utilization equipment 200 to allow automatic input of data from the utilization equipment 200.

When embedding a driver for equipment input corresponding to the utilization equipment 200, the terminal apparatus 100 causes a display 103 to display the input screen 101 in which data acquired from the utilization equipment 200 is input in accordance with the screen definition defined in advance. Next, when the body weight is measured with the utilization equipment 200, the terminal apparatus 100 causes the body weight (data) measured by the utilization equipment 200 to be automatically input to the input field 102. Thus, in the present embodiment, dynamic input of data from the utilization equipment 200 is facilitated.

The terminal apparatus 100 associates data automatically input to the input field 102 with the equipment descriptor and the input field descriptor and stores the data in the input data storing unit 300. Furthermore, the terminal apparatus 100 associates the data automatically input to the input field 102 with the equipment descriptor, the input field descriptor, and the trustworthiness of the data and stores the data in the protected information storing unit 400.

Note that the equipment control module of the present embodiment is software for operating utilization equipment and means the driver for equipment input. In the following description, the equipment control module will be referred to as the driver for equipment input.

Furthermore, in the present embodiment, it is also possible for the user to manually input data measured by the utilization equipment 200 to the terminal apparatus 100.

In this case, the terminal apparatus 100 associates data directly input to the input field 102 with the input field descriptor and stores the data in the input data storing unit 300. Furthermore, the terminal apparatus 100 associates the data directly input to the input field 102 with the input field descriptor and the trustworthiness and stores the data in the protected information storing unit 400.

For example, the information stored in the input data storing unit 300 and the protected information storing unit 400 is information in which the equipment descriptor is not associated with data if data is directly input to the input field 102 by manual input.

Thus, in the present embodiment, it is possible to determine whether data individually stored in the input data storing unit 300 and the protected information storing unit 400 is data automatically input from the utilization equipment 200 or data manually input to the terminal apparatus 100.

Figure 2:
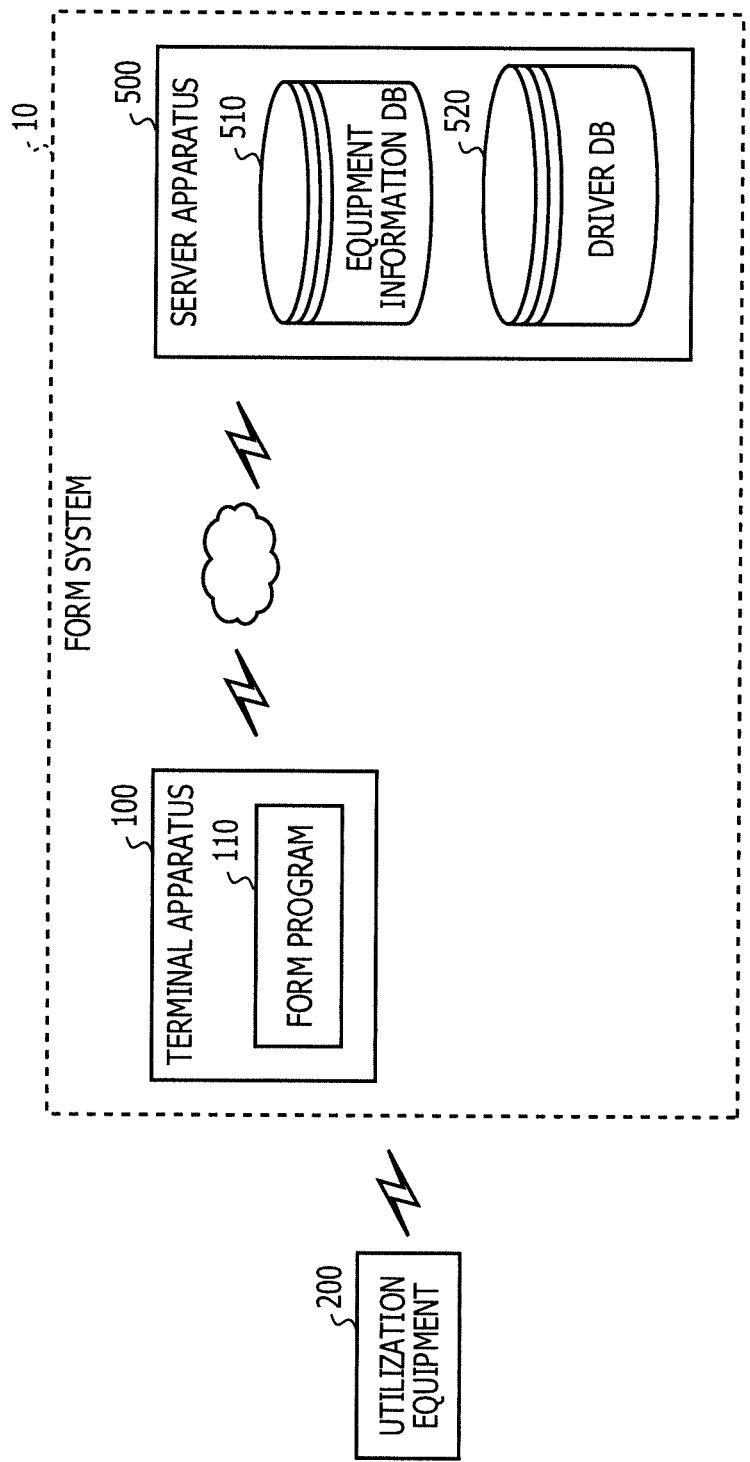
FIG. 2 is a diagram for explaining a system configuration of a form system of the first embodiment.

A form system of the first embodiment will be described below with reference to the drawings. FIG. 2 is a diagram for explaining a system configuration of a form system of the first embodiment.

A form system 10 of the present embodiment is one of information processing systems including the terminal apparatus 100 and a server apparatus 500.

A form program 110 is installed on the terminal apparatus 100 of the present embodiment and data acquired by the utilization equipment 200 is inserted in an input field in an input screen displayed on the terminal apparatus 100. The inserted data may be stored in various kinds of tables or the like possessed by the terminal apparatus 100, or may be used for various kinds of processing in the terminal apparatus 100, for example.

The server apparatus 500 of the present embodiment includes an equipment information database 510 and a driver database 520.

Equipment information of each of pieces of the utilization equipment 200 is stored in the equipment information database 510. The equipment information is information including the access destination in acquisition of the equipment control module corresponding to the utilization equipment 200 and so forth, for example. In the driver database 520, a driver (driver information) of each of pieces of the utilization equipment 200 is stored.

The equipment information database 510 and the driver database 520 of the present embodiment may be provided in an auxiliary storing device or the like of the server apparatus 500, for example. Furthermore, the equipment information database 510 and the driver database 520 of the present embodiment may be provided in the terminal apparatus 100.

Each database possessed by the server apparatus 500 will be described below with reference to FIG. 3 and FIG. 4.

FIG. 3 is a diagram for explaining an equipment information database of the first embodiment. In FIG. 3, one example of the equipment information stored in the equipment information database 510 is represented.

Equipment information 510-1 represented in FIG. 3 is described in a format in which a key (item) and a value of the key are associated with each other.

In a description 510-2, a value of "did" represents an equipment descriptor to identify the equipment. In the description 510-2, an identifier "/wscale" that represents a weight scale is associated.

In a description 510-3, a value of "scan" represents the type of wireless system used for communication. In the description 510-3, "ble" that represents Bluetooth low energy (BLE) is associated as "type."

A description 510-4 represents field information for identifying the utilization equipment. In the description 510-4, the field information is uuid_16 and it is indicated that the value of the field identified by the field information is 0x181d.

Note that, in a description 510-5, the acquisition destination of the driver of the utilization equipment corresponding to the equipment descriptor is described.

In the equipment information 510-1, as the value that represents the type of wireless system, a wireless standard such as Bluetooth (registered trademark) or a wireless local area network (LAN) may be specified besides BLE. Furthermore, if communication is carried out by a wired system, the value of "scan" may represent the type of wired system in the description 510-3. The wired communication is communication based on the universal serial bus (USB) or communication based on a wired LAN or the like, for example. In the communication based on the USB, the utilization equipment is identified by the device class. In the case of the communication based on a wired LAN, the utilization equipment is identified by the internet protocol (IP) address.

Furthermore, in the equipment information 510-1, as the field information for identifying the utilization equipment, a media access control (MAC) address, an access point address, or the like may also be specified besides uuid_16.

Figure 4:
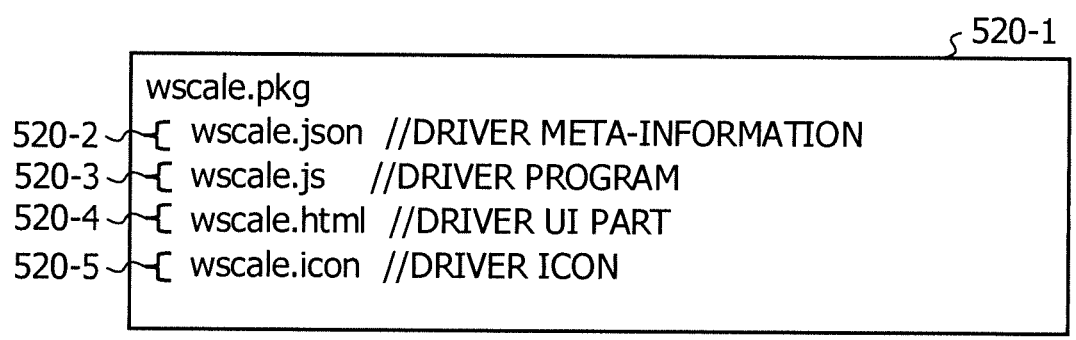
FIG. 4 is a diagram for explaining one example of a driver database.

FIG. 4 is a diagram for explaining one example of a driver database. In FIG. 4, driver information 520-1 stored in the driver database 520 is represented as one example of driver information.

In the driver information 520-1 represented in FIG. 4, a description 520-2 is information in which meta-information of the driver is described. A description 520-3 is a driver program for control of the utilization equipment 200. A description 520-4 represents a screen display part associated with control of the utilization equipment 200. A description 520-5 represents a driver icon used for indicating that the existence of the utilization equipment 200 has been detected on the screen.

The driver information of the present embodiment is what is obtained by assembling the above-described descriptions 520-2, 520-3, 520-4, and 520-5 into one package.

Figure 5:
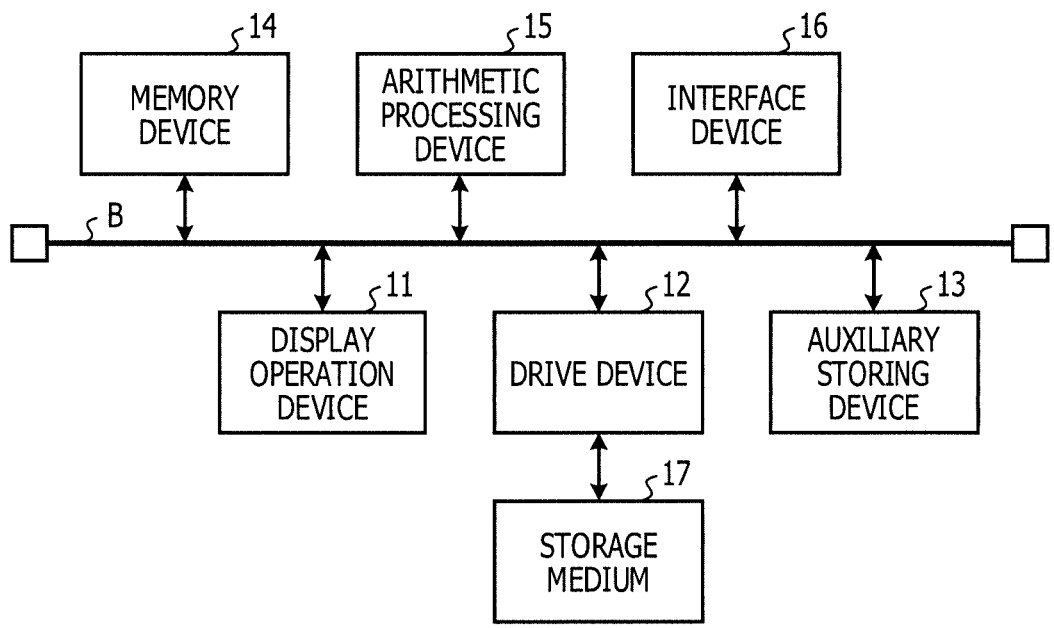
FIG. 5 is a diagram illustrating one example of a hardware configuration of a terminal apparatus of the first embodiment.

Next, the terminal apparatus 100 of the present embodiment will be described. FIG. 5 is a diagram illustrating one example of a hardware configuration of a terminal apparatus of the first embodiment.

The terminal apparatus 100 of the present embodiment is an information processing apparatus including a display operation device 11, a drive device 12, an auxiliary storing device 13, a memory device 14, an arithmetic processing device 15, and an interface device 16 that are mutually coupled by a bus B.

The display operation device 11 is a touch panel or the like that implements input of various kinds of information and output (display) of various kinds of information. The interface device 16 includes a modem, a LAN card, and so forth and is used for coupling to a network.

The form program is at least part of various kinds of programs that control the terminal apparatus 100. A form application is provided through distribution of a storage medium 17, download from the network or the like, for example. As the storage medium 17 in which the form program is recorded, storage media of various types may be used such as storage media in which information is recorded optically or electrically or magnetically like compact disc read-only memory (CD-ROM), flexible disc, and magneto-optical disc and semiconductor memories in which information is electrically recorded like ROM and flash memory.

Furthermore, when the storage medium 17 in which the form program is recorded is set in the drive device 12, the form program is installed on the auxiliary storing device 13 from the storage medium 17 via the drive device 12. The form program downloaded from the network is installed on the auxiliary storing device 13 via the interface device 16.

The auxiliary storing device 13 stores the installed form program and stores files, data, and so forth to be used. The memory device 14 reads out the form program from the auxiliary storing device 13 and stores the form program when the computer is activated. Furthermore, the arithmetic processing device 15 implements various kinds of processing to be described later in accordance with the form program stored in the memory device 14.

Furthermore, the terminal apparatus 100 of the present embodiment may be a notebook-type computer. In this case, the terminal apparatus 100 may include an input device and an output device instead of the display operation device 11. Moreover, the server apparatus 500 of the present embodiment is a computer including an arithmetic processing device and a memory device, and the hardware configuration thereof is similar to that of the terminal apparatus 100 illustrated in FIG. 5 and thus description is omitted.

Next, functions of the terminal apparatus 100 of the present embodiment will be described with reference to FIG.

Figure 6:
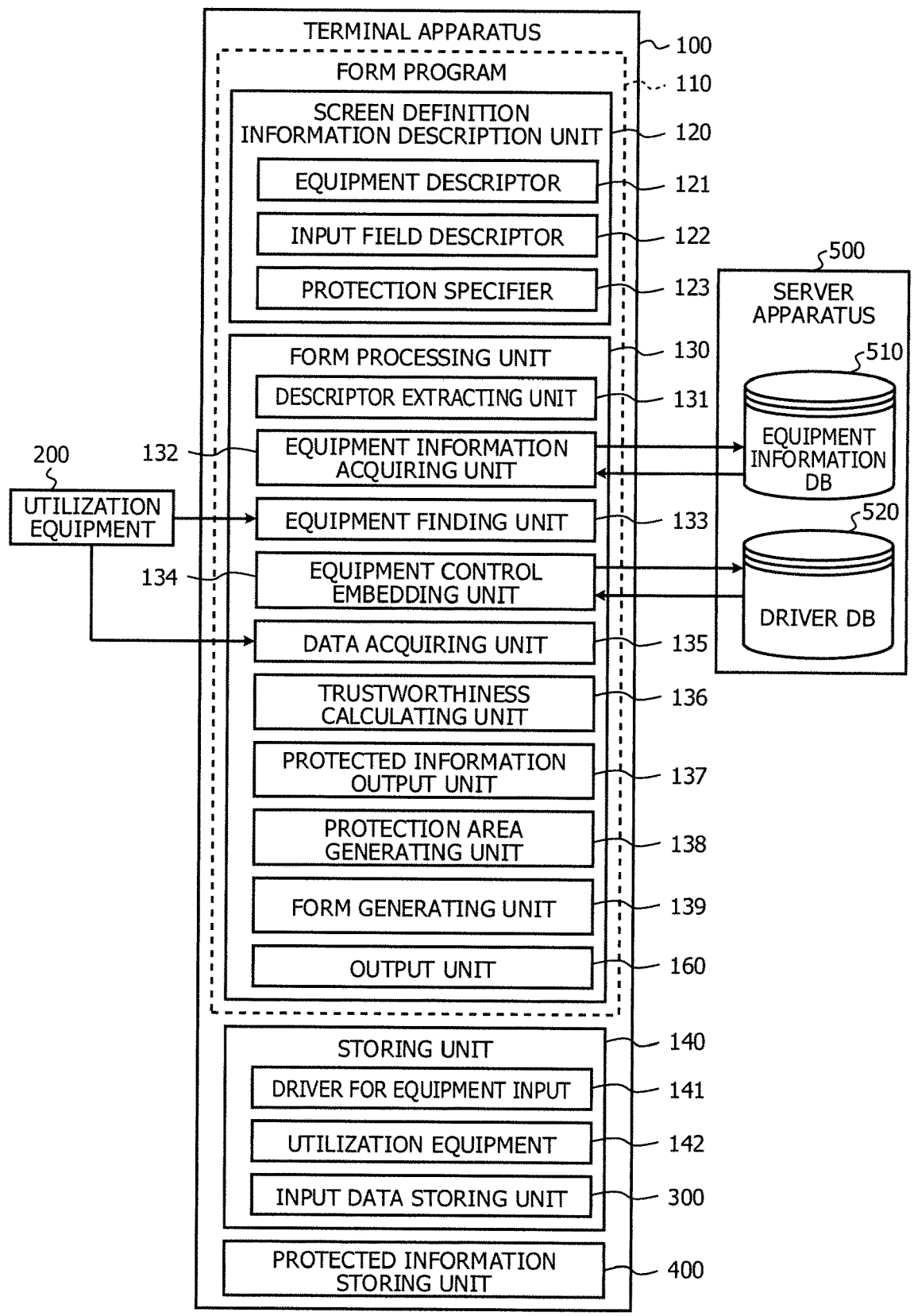
FIG. 6 is a diagram for explaining functions of a terminal apparatus of the first embodiment.

6. FIG. 6 is a diagram for explaining functions of a terminal apparatus of the first embodiment.

The terminal apparatus 100 of the present embodiment implements the functions of the following respective units through execution of the form program 110 by the arithmetic processing device 15. For example, the arithmetic processing device 15 (referred to also as processor) of the terminal apparatus 100 executes the form program 110 stored in a memory and thereby is converted to a hardware circuit that executes processing relating to the functions of the following respective units.

The form program 110 of the present embodiment includes a screen definition information description unit 120, a form processing unit 130, and a storing unit 140.

The screen definition information description unit 120 includes descriptions of the display method and layout of the input screen in the terminal apparatus 100. The form processing unit 130 includes descriptions of internal processing of the form.

Screen definition information described in the screen definition information description unit 120 of the present embodiment includes an equipment descriptor 121, an input field descriptor 122, and a protection specifier 123.

The equipment descriptor 121 is equivalent to an equipment identification (ID) to identify the utilization equipment 200. The input field descriptor 122 is equivalent to an input field ID to identify the input field of data in the input screen. The protection specifier 123 indicates whether or not input data is deemed as a protection subject.

In the present embodiment, data that is not deemed as a protection subject due to the protection specifier 123 is not stored in the protected information storing unit 400 but stored only in the input data storing unit 300. Note that the protection specifier may be clearly specified, or may be determined that the protection specifier is clearly specified if the equipment descriptor exists.

The form processing unit 130 of the present embodiment includes a descriptor extracting unit 131, an equipment information acquiring unit 132, an equipment finding unit 133, an equipment control embedding unit 134, a data acquiring unit 135, a trustworthiness calculating unit 136, a protected information output unit 137, a protection area generating unit 138, a form generating unit 139, and an output unit 160.

The descriptor extracting unit 131 extracts the equipment descriptor 121 and the input field descriptor 122 from the screen definition information.

The equipment information acquiring unit 132 uses the equipment descriptor as a key and searches the equipment information database 510 to acquire equipment information to be used for equipment seeking to be described later. Note that the equipment information acquiring unit 132 of the present embodiment may execute processing of acquiring the equipment information if automatic input of data is selected in the terminal apparatus 100, for example.

The equipment finding unit 133 seeks the utilization equipment 200 that exists around the terminal apparatus 100 based on the acquired equipment information and detects the existence of the utilization equipment 200.

The equipment control embedding unit 134 refers to the driver database 520 and acquires a driver 141 for equipment input (equipment control module) for controlling the utilization equipment 200 whose existence has been detected, and embeds the driver 141 for equipment input in the terminal apparatus 100. For example, the equipment control embedding unit 134 of the present embodiment dynamically acquires the driver 141 for equipment input and embeds the driver 141 for equipment input in the terminal apparatus 100.

Furthermore, the equipment control embedding unit 134 determines whether or not data is deemed as a protection subject based on the protection specifier 123. If data is deemed as a protection subject, the equipment control embedding unit 134 embeds a description for calling the protected information output unit 137 in the driver 141 for equipment input or a driver 142 for manual input.

If the driver 141 for equipment input is embedded, the data acquiring unit 135 transmits an equipment control command to the utilization equipment 200 by using the driver 141 for equipment input and acquires data from the utilization equipment 200. Furthermore, if input by manual input is selected in the terminal apparatus 100, the data acquiring unit 135 acquires data input by the display operation device 11 or the like possessed by the terminal apparatus 100.

Furthermore, the data acquiring unit 135 stores the acquired data in the input data storing unit 300 as input data associated with the equipment descriptor 121 and the input field descriptor 122.

In addition, if data is input by the utilization equipment 200, by the driver 141 for equipment input, the data acquiring unit 135 acquires hardware (hereinafter, HW) type information calculated by the driver 141 for equipment input from information that represents the type of hardware of the utilization equipment 200, such as the manufacturer name and manufacturing number of the utilization equipment 200. In the present embodiment, the hardware type information is information that represents the trustworthiness of the hardware of the utilization equipment 200.

Moreover, the data acquiring unit 135 acquires information that represents the type of driver 141 for equipment input, such as the manufacturer and code signature of the driver 141 for equipment input, and calculates software type information. The software type information is information that represents the trustworthiness of the driver 141 for equipment input embedded in the terminal apparatus 100.

Furthermore, if data is manually input to the terminal apparatus 100, the data acquiring unit 135 causes user information of the user who inputs the data to be input and acquires the user information as information that represents the type of user. Note that it is preferable for the user information of the present embodiment to be information including the department to which the user belongs, the post and class of the user and so forth, for example.

The data acquiring unit 135 passes the respective acquired pieces of type information to the trustworthiness calculating unit 136.

The trustworthiness calculating unit 136 calculates the trustworthiness that represents the degree of trust indicating whether or not input data is a reliable value. Furthermore, the trustworthiness calculating unit 136 associates the input field descriptor and the calculated trustworthiness and outputs the input field descriptor and the trustworthiness to the protected information storing unit 400. In the protected information storing unit 400, the trustworthiness is associated with protected information having the identical input field descriptor.

For example, if data is input by the utilization equipment 200, the trustworthiness calculating unit 136 calculates the trustworthiness of the input data by using the hardware type information and the software type information. Furthermore, if data is input by manual input, the trustworthiness calculating unit 136 calculates user type information that represents the trustworthiness of the user by further using information that represents the type of user.

If input data is data of a protection subject, the protected information output unit 137 associates the equipment descriptor and the input field descriptor with the input data and outputs the equipment descriptor, the input field descriptor, and the input data to the protected information storing unit 400 as part of protected information. Details of the protected information will be described later.

The protection area generating unit 138 generates and sets the protected information storing unit 400 when the form program 110 is installed on the terminal apparatus 100.

The form generating unit 139 refers to the input data storing unit 300 and refers to the protected information storing unit 400 in response to reception of a request for display of a form screen to generate the form screen and cause the form screen to be displayed. The form screen is a screen on which input data is displayed. Details of functions of the form generating unit 139 will be described later.

Furthermore, details of the processing of the above-described respective units will be described later.

The output unit 160 outputs the form screen generated by the form generating unit 139 to an external output equipment. For example, the output unit 160 receives an instruction to print the form screen and outputs image data of the form screen to a printer.

The storing unit 140 is a storage area provided in the auxiliary storing device 13, the memory device 14 or the like of the terminal apparatus 100 and the driver 141 for equipment input acquired by the equipment control embedding unit 134 and the driver 142 for manual input are stored in the storage area. The driver 142 for manual input is a driver of the display operation device 11 and may be possessed by the terminal apparatus 100 in advance, for example.

Furthermore, the input data storing unit 300 is provided in the storing unit 140. The storing unit 140 of the present embodiment is a storage area in which editing of stored data is possible.

The protected information storing unit 400 represents a storage area that is set by the protection area generating unit 138 and is isolated from the space in which the screen definition information description unit 120 and the input data storing unit 300 are placed. In the present embodiment, for example, if a security chip or the like is mounted in the terminal apparatus 100, the protected information storing unit 400 is set in the security chip. The security chip intends to suppress leakage of information and is a chip that stores a key to release encryption of a hard disc and decrypts the contents of the hard disc according to need to allow the contents to be used.

Note that, in the present embodiment, the protected information storing unit 400 is defined as what is possessed by the terminal apparatus 100. However, the protected information storing unit 400 is not limited thereto. The protected information storing unit 400 may be set in apparatus outside the terminal apparatus 100, for example. For example, the protected information storing unit 400 may be set in a server coupled to the terminal apparatus 100 through a network.

Next, the protected information of the present embodiment and the protected information storing unit 400 will be described with reference to FIG. 7 and FIG. 8. FIG. 7 is a diagram illustrating one example of a description that represents protected information of the first embodiment. Note that, in FIG. 7, an example of the protected information when data is input to the terminal apparatus 100 from the utilization equipment 200 is illustrated.

Protected information 71 of the present embodiment includes an identifier 71-1 for identifying the protected information, data 71-2 that is input, an equipment descriptor 71-3 of the utilization equipment 200, an input field descriptor 71-4 to identify the input field, and trustworthiness 71-5.

If data is manually input, the equipment descriptor 71-3 is not included in the protected information 71. Thus, in the following description, information including at least items of "identifier," "data," "input field descriptor (input field ID)," and "trustworthiness" will be called protected information. Protected information including the item "equipment descriptor" is protected information when data acquired by communication with the utilization equipment 200 is input.

If input data is a protection subject, the protected information output unit 137 of the present embodiment associates the data 71-2 with the equipment descriptor 71-3 and the input field descriptor 71-4 and outputs the data 71-2, the equipment descriptor 71-3, and the input field descriptor 71-4 to the protected information storing unit 400 as part of the protected information 71. At this time, the protected information output unit 137 may give the identifier 71-1.

Furthermore, when calculating the trustworthiness based on the hardware type information and the software type information, the trustworthiness calculating unit 136 associates the calculated trustworthiness with the input field descriptor 71-4 associated with each piece of type information and stores the trustworthiness in the protected information storing unit 400.

As a result, the protected information 71 is generated.

FIG. 8 is a diagram illustrating one example of a protected information storing unit of the first embodiment. In the protected information storing unit 400 illustrated in FIG. 8, information is stored as protected information in which information output from the protected information output unit 137 is associated with the trustworthiness output from the trustworthiness calculating unit 136.

The protected information of the present embodiment includes an identifier (ID) of the information, data that is input, an equipment descriptor, an input field descriptor, and trustworthiness as items of the information as illustrated in FIG. 7.

In FIG. 8, the case in which pieces 81 and 82 of protected information are stored in the protected information storing unit 400 is illustrated. For example, it turns out that, regarding the protected information 81, an ID "0123" is given and the value of the item "data" is "85" and the value of the item "equipment descriptor" (equipment ID) is "wscale" and the value of the item "input field descriptor" (input field ID) is "weight" and the value of the item "trustworthiness" is "A."

Note that, in the example of FIG. 8, one record is made regarding one input field descriptor. However, the protected information storing unit 400 is not limited thereto. In the protected information storing unit 400, every time data is input to one input field, the input data is associated with the input field descriptor of the input field. Therefore, in the protected information storing unit 400, the history of data input to the input field represented by the input field descriptor is stored regarding each input field descriptor.

Figure 9:
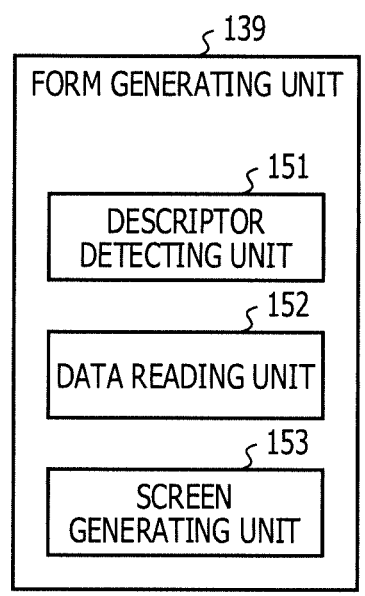
FIG. 9 is a diagram for explaining functions of a form generating unit.

Next, functions of the form generating unit 139 of the present embodiment will be described with reference to FIG. 9. FIG. 9 is a diagram for explaining functions of a form generating unit.

The form generating unit 139 of the present embodiment generates a form to be displayed by the terminal apparatus 100 and outputs the form. The form generating unit 139 of the present embodiment includes a descriptor detecting unit 151, a data reading unit 152, and a screen generating unit 153.

The descriptor detecting unit 151 detects a screen in which data is a protection subject from the screen definition information and identifies the input field from the input field descriptor.

The data reading unit 152 reads out and acquires data associated with the input field descriptor from the protected information storing unit 400. Furthermore, the data reading unit 152 reads out data associated with the input field descriptor also from the input data storing unit 300.

The screen generating unit 153 compares the two pieces of data that are read out and causes display of a form screen (viewed screen) in which a form is displayed based on the comparison result and the trustworthiness included in the protected information.

Figure 10:
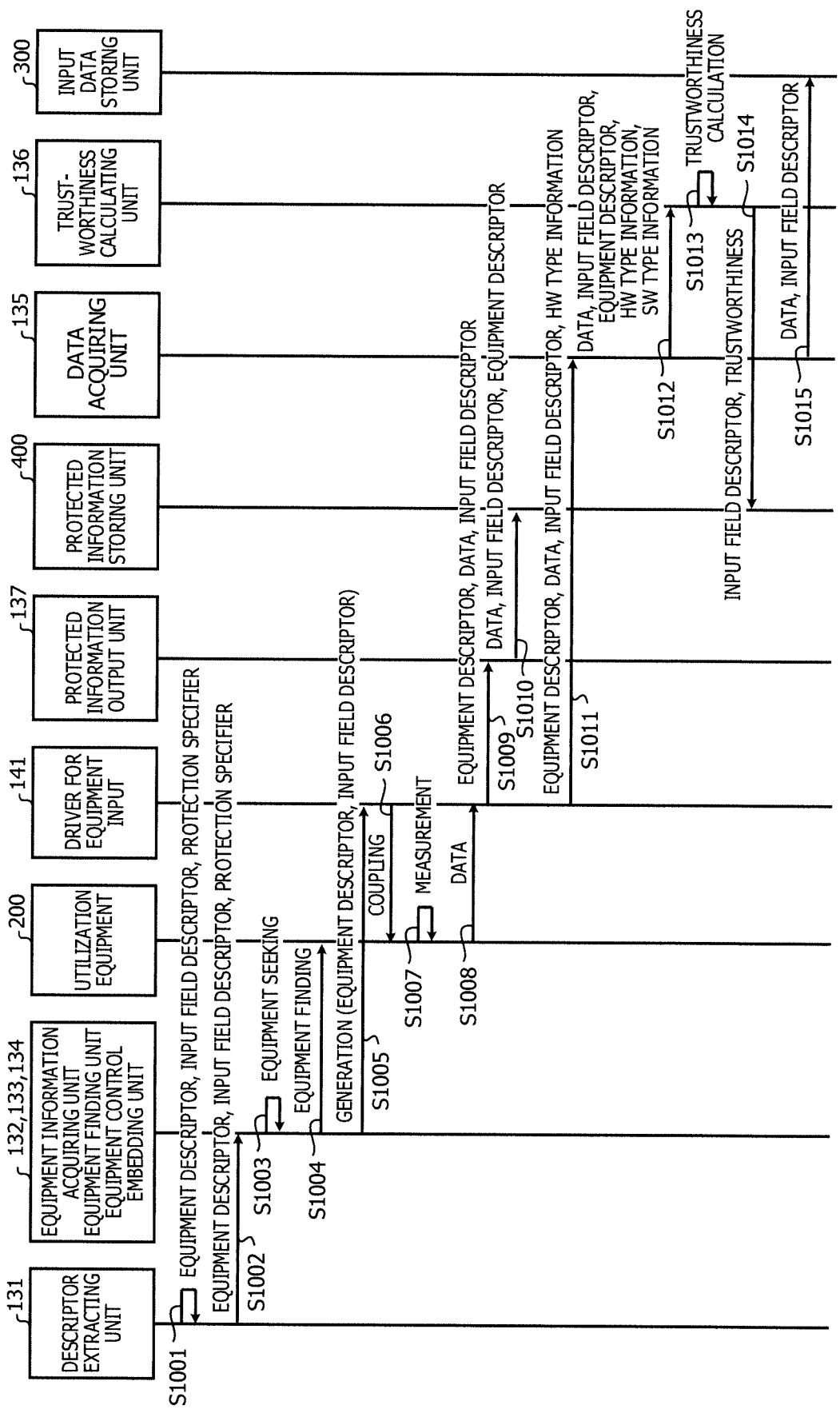
FIG. 10 is a first sequence diagram for explaining operation of a terminal apparatus of the first embodiment.

Next, the operation of the terminal apparatus 100 of the present embodiment will be described with reference to FIG. 10. FIG. 10 is a first sequence diagram for explaining operation of a terminal apparatus of the first embodiment. In FIG. 10, a sequence diagram when data measured by the utilization equipment 200 is input to the terminal apparatus 100 and this data is deemed as data of a protection subject based on the protection specifier 123 is illustrated.

In the terminal apparatus 100 of the present embodiment, the form processing unit 130 extracts the screen definition information of the screen definition information description unit 120 by the descriptor extracting unit 131 (step S1001). Subsequently, the descriptor extracting unit 131 extracts the equipment descriptor 121, the input field descriptor 122, and the protection specifier 123 from the screen definition information (step S1002). Subsequently, the form processing unit 130 searches the equipment information database 510 with the equipment descriptor 121 and acquires the relevant equipment information by the equipment information acquiring unit 132 (step S1003).

Subsequently, the form processing unit 130 seeks the utilization equipment 200 represented by the equipment descriptor 121 and finds the utilization equipment 200 by the equipment finding unit 133 (step S1004).

Next, the form processing unit 130 acquires the driver corresponding to the utilization equipment 200 from the driver database 520 and embeds the respective modules in the driver in the form program 110 by the equipment control embedding unit 134. Furthermore, in the example of FIG. 10, because the data is a protection subject based on the protection specifier, the equipment control embedding unit 134 embeds a description for calling the protected information output unit 137 in the driver 141 for equipment input (step S1005). Here, the terminal apparatus 100 becomes the state in which the terminal apparatus 100 waits for the occurrence of an event from the utilization equipment 200.

Next, the form processing unit 130 is coupled to the utilization equipment 200 (step S1006) and acquires the data measured by the utilization equipment 200 by the driver 141 for equipment input (steps S1007 and S1008) to output the equipment descriptor 121, the data, and the input field descriptor 122 to the protected information output unit 137 (step S1009).

Because the accepted data is a protection subject, the protected information output unit 137 stores the equipment descriptor 121, the data, and the input field descriptor 122 in the protected information storing unit 400 (step S1010). At this time, the protected information output unit 137 gives an ID to the stored information.

Furthermore, the driver 141 for equipment input outputs the equipment descriptor 121, the data, and the input field descriptor 122 to the data acquiring unit 135 (step S1011). At this time, if having succeeded in calculating the hardware type information of the utilization equipment 200, the driver 141 for equipment input also outputs the hardware type information together to the data acquiring unit 135.

Subsequently, the data acquiring unit 135 passes the equipment descriptor 121, the data, the input field descriptor 122, and the hardware type information to the trustworthiness calculating unit 136 (step S1012). At this time, if having succeeded in calculating the software type information of the driver 141 for equipment input from the driver 141 for equipment input, the data acquiring unit 135 also passes the software type information to the trustworthiness calculating unit 136.

When acquiring the hardware type information and the software type information, the trustworthiness calculating unit 136 calculates the trustworthiness of the input data (step S1013). Details of the calculation of the trustworthiness of the input data will be described later.

Subsequently, the trustworthiness calculating unit 136 stores the calculated trustworthiness and the input field descriptor in the protected information storing unit 400 (step S1014). At this time, the trustworthiness calculating unit 136 associates the trustworthiness with the input field descriptor that corresponds with the input field descriptor associated with the trustworthiness and stores the trustworthiness in the protected information storing unit 400.

Note that, in the case in which the input field descriptor associated with the trustworthiness does not exist in the protected information storing unit 400, the trustworthiness calculating unit 136 merely stores only the trustworthiness and the input field descriptor in the protected information storing unit 400. The case in which the input field descriptor associated with the trustworthiness does not exist in the protected information storing unit 400 is the case in which the input data is not deemed as a protection subject based on the protection specifier of the screen definition information.

Subsequently, the data acquiring unit 135 stores the data and the input field descriptor in the input data storing unit 300 (step S1015).

The above is the operation of the terminal apparatus 100 in the case in which data measured by the utilization equipment 200 is a protection subject when the data is input to the input screen of the terminal apparatus 100.

Next, with reference to FIG. 11, the operation of the terminal apparatus 100 when data is directly input to the input screen of the terminal apparatus 100 will be described.

Figure 11:
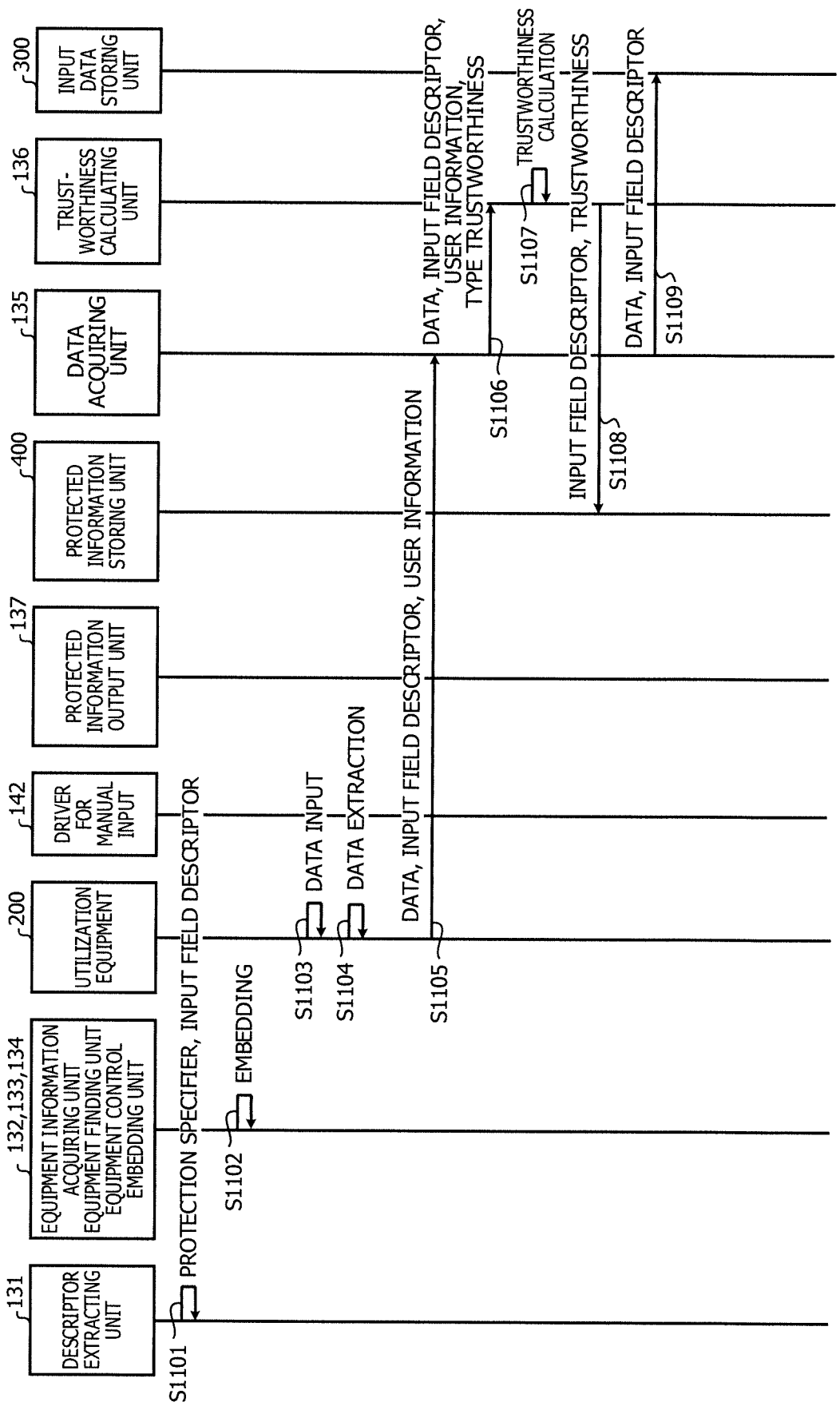
FIG. 11 is a second sequence diagram for explaining operation of a terminal apparatus of the first embodiment.

FIG. 11 is a second sequence diagram for explaining operation of a terminal apparatus of the first embodiment. Also in the example of FIG. 11, the case in which data input to the input screen is deemed as a protection subject based on the protection specifier is illustrated.

In the terminal apparatus 100 of the present embodiment, the form processing unit 130 extracts the input field descriptor from the screen definition information of the screen definition information description unit 120 by the descriptor extracting unit 131 (step S1101).

In the example of FIG. 11, because the data is a protection subject based on the protection specifier, the equipment control embedding unit 134 embeds a description for calling the protected information output unit 137 in the driver 142 for manual input (step S1102).

Subsequently, the terminal apparatus 100 accepts input of the data to the display operation device 11 or the like by the driver 142 for manual input, for example (step S1103).

Subsequently, the driver 142 for manual input identifies the input field from the place at which the data is input to the input screen, and extracts the input data (step S1104).

Note that, in the present embodiment, at this time, the user information of the user who inputs the data with the terminal apparatus 100 may be input. For example, if, before the input screen is displayed, the terminal apparatus 100 is caused to display an input screen of the user information and the input of the user information is completed and manual input is selected as the input method of data, the input screen of data may be displayed.

The driver 142 for manual input passes the input data and the input field descriptor of the identified input field to the data acquiring unit 135 (step S1105). Furthermore, when acquiring the user information, the driver 142 for manual input passes the user information to the data acquiring unit 135.

The data acquiring unit 135 passes the data, the input field descriptor, and the user information to the trustworthiness calculating unit 136 (step S1106). The trustworthiness calculating unit 136 calculates the trustworthiness of the data based on the user information (step S1107).

The processing of a step S1108 and a step S1109 in FIG. 11 is similar to the processing of the step S1014 and the step S1015 in FIG. 10 and therefore description is omitted.

The above is the operation of the terminal apparatus 100 in the case in which data is a protection subject when the data is manually input to the input screen of the terminal apparatus 100.

Next, with reference to FIG. 12, the operation of the terminal apparatus 100 when a request for display of the form screen is made to the terminal apparatus 100 will be described.

Figure 12:
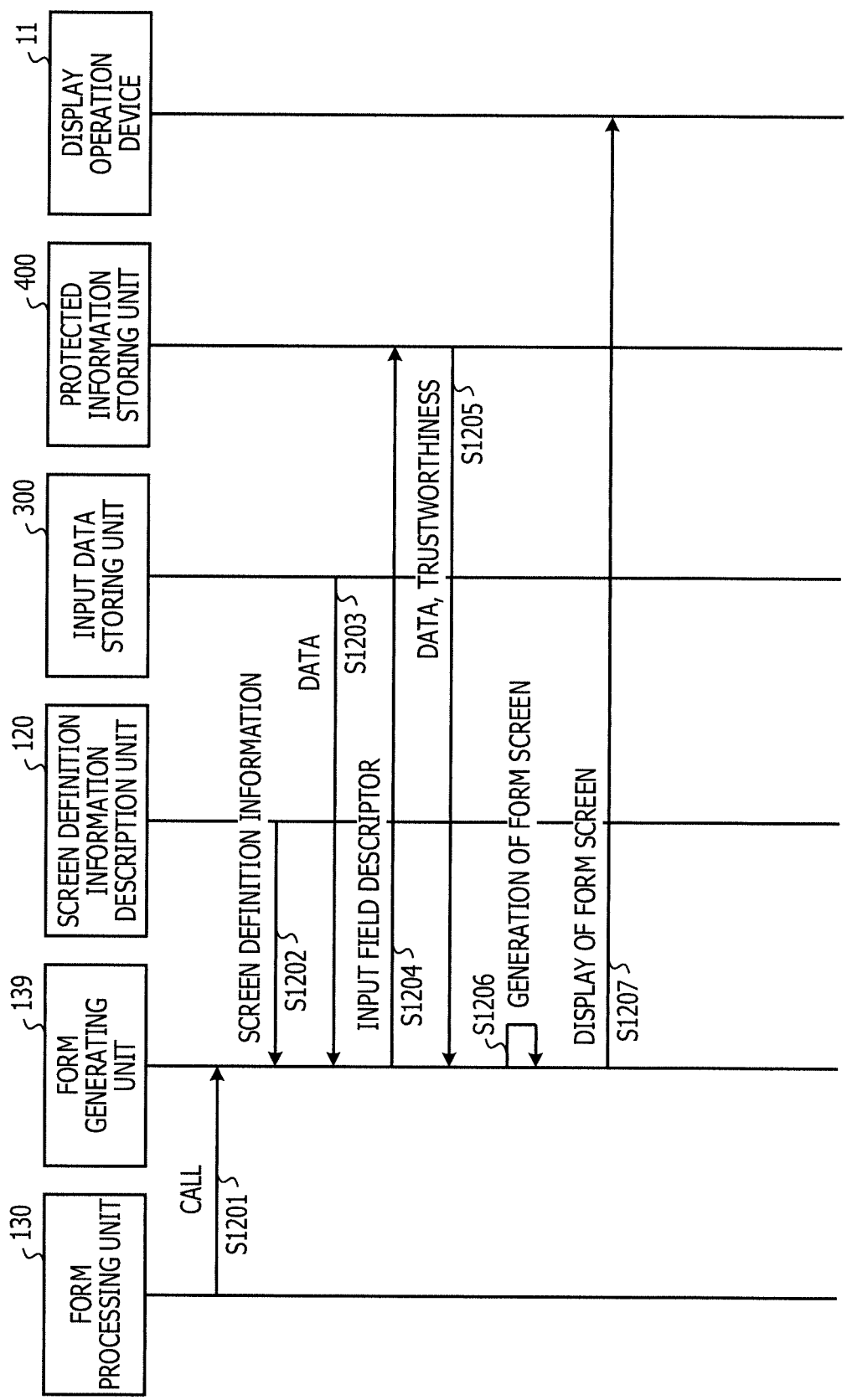
FIG. 12 is a third sequence diagram for explaining operation of a terminal apparatus of the first embodiment.

FIG. 12 is a third sequence diagram for explaining operation of a terminal apparatus of the first embodiment.

In the present embodiment, the terminal apparatus 100 receives a request for display of the form screen and activates the form processing unit 130. For example, the terminal apparatus 100 receives the request for display of the form screen and activates the form program 110. Then, the form processing unit 130 calls the form generating unit 139 (step S1201).

Subsequently, the form generating unit 139 acquires the screen definition information of the form screen from the screen definition information description unit 120 (step S1202). Furthermore, the form generating unit 139 acquires data from the input data storing unit 300 (step S1203).

Next, the form generating unit 139 passes the input field descriptor 122 included in the screen definition information to the protected information storing unit 400 (step S1204) and acquires data associated with the input field descriptor and the trustworthiness from the protected information storing unit 400 (step S1205).

Subsequently, the form generating unit 139 generates screen data of the form screen based on the screen definition information, the data, the trustworthiness and so forth that are acquired (step S1206). Then, the form generating unit 139 causes the display operation device 11 to display the screen data (step S1207).

The above is the operation of the terminal apparatus 100 when a request for display of the form screen is received.

Next, with reference to FIG. 13 to FIG. 20, details of the processing of the respective units possessed by the form processing unit 130 of the terminal apparatus 100 of the present embodiment will be described.

Figure 13:
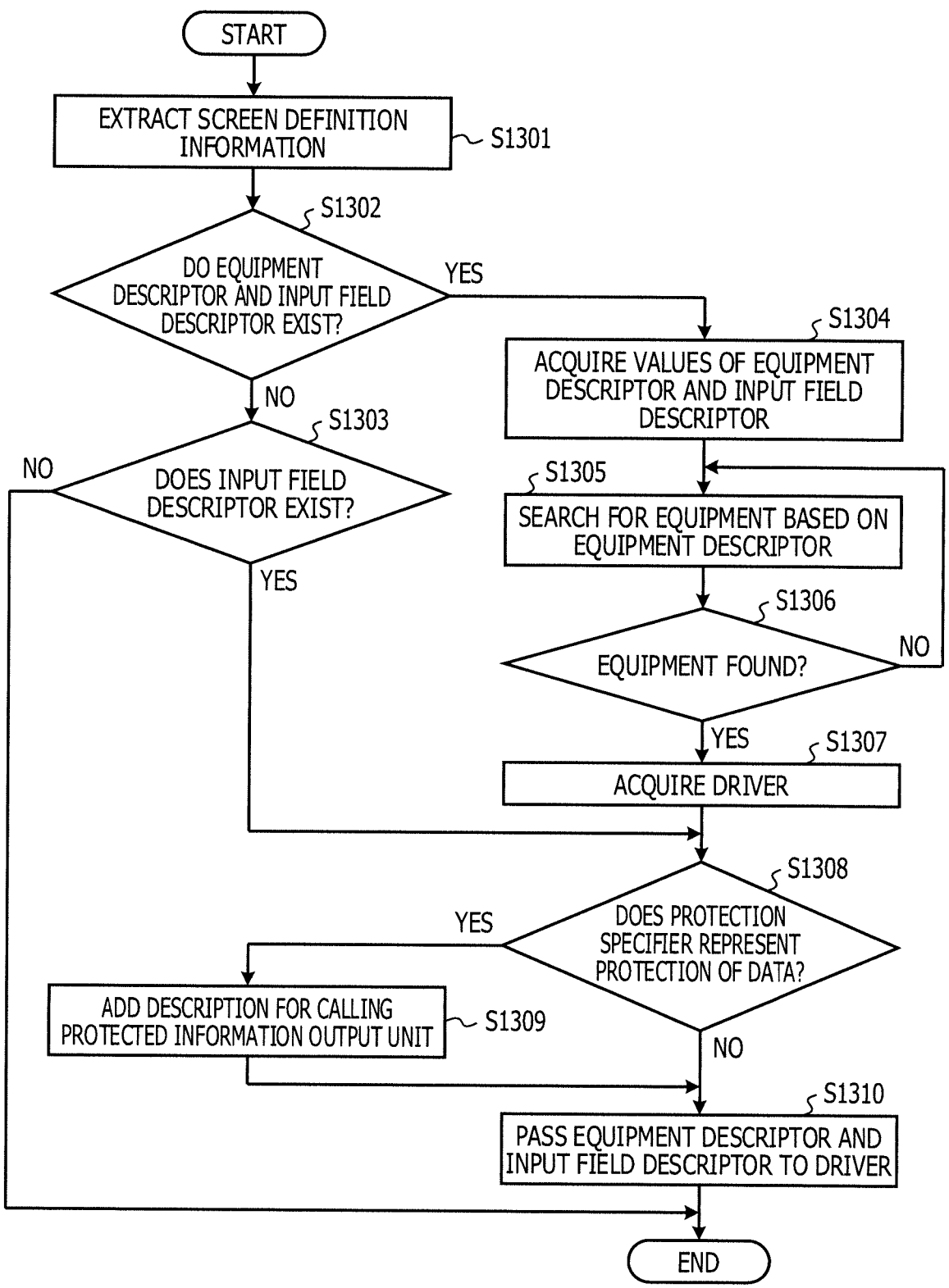
FIG. 13 is a flowchart for explaining processing of a descriptor extracting unit, an equipment information acquiring unit, an equipment finding unit, and an equipment control embedding unit.

First, with reference to FIG. 13, the processing of the descriptor extracting unit 131, the equipment information acquiring unit 132, the equipment finding unit 133, and the equipment control embedding unit 134 in the form processing unit 130 will be described. FIG. 13 is a flowchart for explaining processing of a descriptor extracting unit, an equipment information acquiring unit, an equipment finding unit, and an equipment control embedding unit.

In the form processing unit 130 of the present embodiment, the descriptor extracting unit 131 extracts the screen definition information from the screen definition information description unit 120 (step S1301). Subsequently, the descriptor extracting unit 131 determines whether or not the equipment descriptor (equipment ID) and the input field descriptor (input field ID) are included in the screen definition information (step S1302).

If the two descriptors do not exist in the step S1302, the descriptor extracting unit 131 determines whether or not the input field descriptor (input field ID) is included in the screen definition information (step S1303). If the input field descriptor is not included in the step S1303, the form processing unit 130 ends the processing.

If the input field descriptor is included in the step S1303, the form processing unit 130 proceeds to a step S1308 to be described later.

Note that, in the present embodiment, the case in which the equipment descriptor is included in the screen definition information represents the case in which data is input to the input screen from the utilization equipment 200 via the driver 141 for equipment input. The case in which the equipment descriptor is not included represents the case in which data is input to the input screen by manual input.

If the two descriptors exist in the step S1302, the descriptor extracting unit 131 acquires the equipment descriptor and the input field descriptor and passes the equipment descriptor and the input field descriptor to the equipment information acquiring unit 132 (step S1304).

The equipment information acquiring unit 132 acquires equipment information from the equipment information database 510 based on the equipment descriptor and passes the equipment information to the equipment finding unit 133. The equipment finding unit 133 searches the surroundings of the terminal apparatus 100 based on the equipment information (step S1305).

When the equipment finding unit 133 finds (detects) the utilization equipment 200 (step S1306), the equipment control embedding unit 134 acquires the driver 141 for equipment input corresponding to the found utilization equipment 200 from the driver database 520 and embeds the respective modules in the driver 141 for equipment input in the form program 110 (step S1307).

Note that, if the equipment finding unit 133 does not detect the utilization equipment 200 in the step S1305, the equipment finding unit 133 waits until the utilization equipment 200 is found.

Subsequently, the equipment control embedding unit 134 determines whether or not input data is deemed as a protection subject based on the protection specifier of the screen definition information (step S1308).

If data is not a protection subject in the step S1308, the equipment control embedding unit 134 proceeds to a step S1310 to be described later.

If data is deemed as a protection subject in the step S1308, the equipment control embedding unit 134 adds an description for calling the protected information output unit 137 to the driver 141 for equipment input or the driver 142 for manual input (step S1309).

Note that, in the step S1309, a description for calling the protected information output unit 137 is added to the driver 141 for equipment input if the equipment descriptor is included in the screen definition information, and a description for calling the protected information output unit 137 is added to the driver 142 for manual input if the equipment descriptor is not included (Yes in the step S1303).

Subsequently, the equipment control embedding unit 134 passes the equipment descriptor and the input field descriptor to the driver (step S1310) and ends the processing.

Note that, if the equipment descriptor is included in the screen definition information, the equipment control embedding unit 134 passes the equipment descriptor and the input field descriptor to the driver 141 for equipment input. If the equipment descriptor is not included (Yes in the step S1303), the equipment control embedding unit 134 passes the input field descriptor to the driver 142 for manual input.

Figure 14:
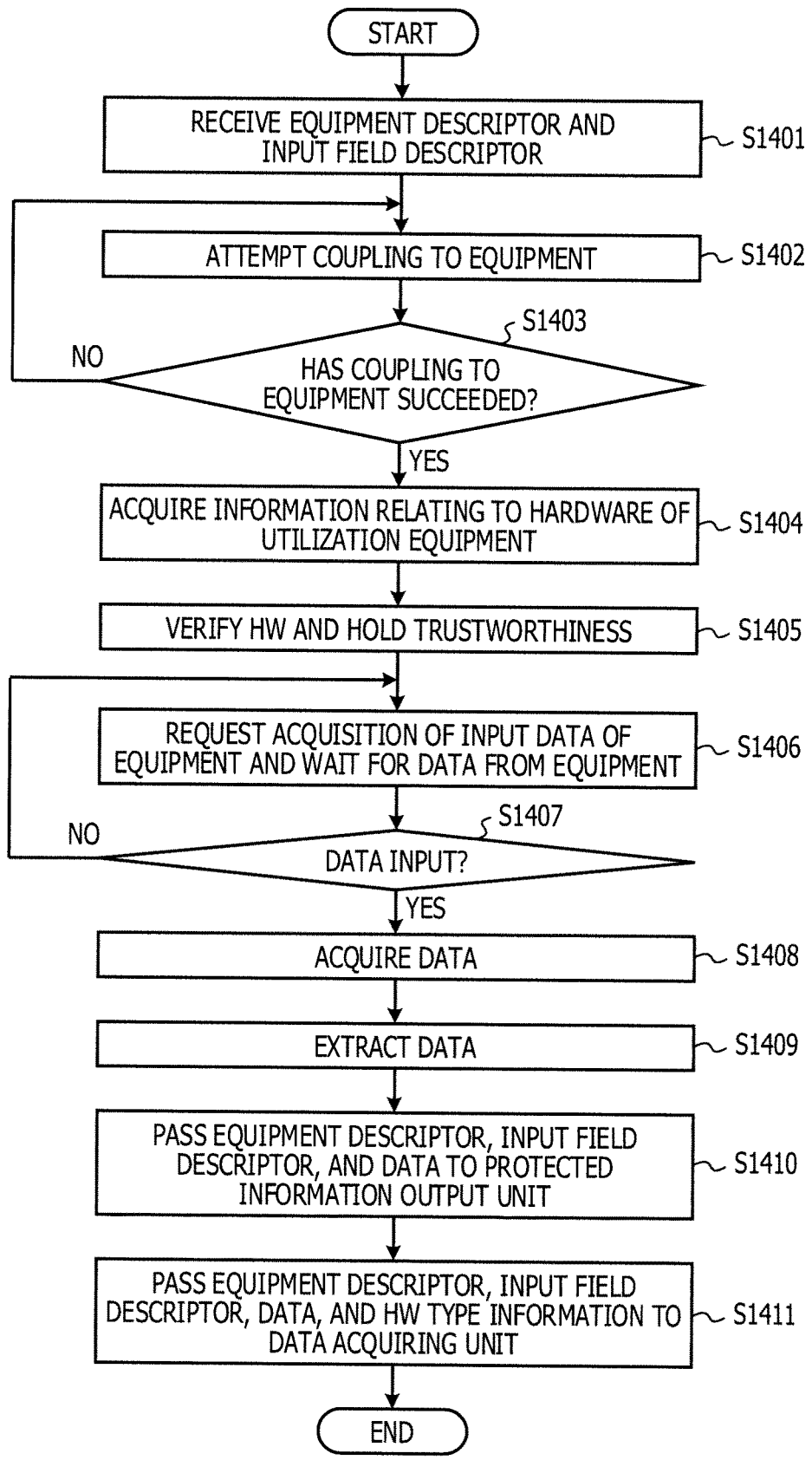
FIG. 14 is a flowchart for explaining operation of a driver for equipment input.

Next, the operation of the driver 141 for equipment input will be described with reference to FIG. 14. FIG. 14 is a flowchart for explaining operation of a driver for equipment input.

When being embedded in the terminal apparatus 100, the driver 141 for equipment input receives the equipment descriptor and the input field descriptor from the equipment control embedding unit 134 (step S1401). Subsequently, the driver 141 for equipment input attempts coupling to the utilization equipment 200 identified by the equipment descriptor (step S1402).

The driver 141 for equipment input determines whether or not the coupling to the utilization equipment 200 has succeeded (step S1403). If the coupling has not succeeded, the driver 141 for equipment input makes attempts until the coupling succeeds.

If the coupling has succeeded in the step S1403, the driver 141 for equipment input acquires information that represents the kind of hardware of the utilization equipment 200 from the utilization equipment 200 (step S1404).

Subsequently, the driver 141 for equipment input verifies the information that represents the kind of hardware and acquires the trustworthiness of the hardware to hold this trustworthiness as the hardware type information (step S1405). Details of the method for acquiring the trustworthiness of the hardware will be described later.

Subsequently, the driver 141 for equipment input waits until data is input from the utilization equipment 200 (step S1406) and determines whether or not data has been input (step S1407).

If data has not been input in the step S1407, the driver 141 for equipment input returns to the step S1406 and waits.

If data has been input in the step S1407, the driver 141 for equipment input acquires the data input to the input screen (step S1408) and extracts the data (step S1409).

Subsequently, the driver 141 for equipment input passes the extracted data, the equipment descriptor, and the input field descriptor to the protected information output unit 137 (step S1410). Subsequently, the driver 141 for equipment input passes the data, the equipment descriptor, the input field descriptor, and the hardware type information to the data acquiring unit 135 (step S1411) and ends the processing.

Note that, in the example of FIG. 14, the driver 141 for equipment input acquires the trustworthiness of the hardware of the utilization equipment 200. However, the driver 141 for equipment input may acquire the user information of the user who carries out measurement by using the utilization equipment 200. The user information is passed to the data acquiring unit 135 similarly to the hardware type information.

Figure 15:
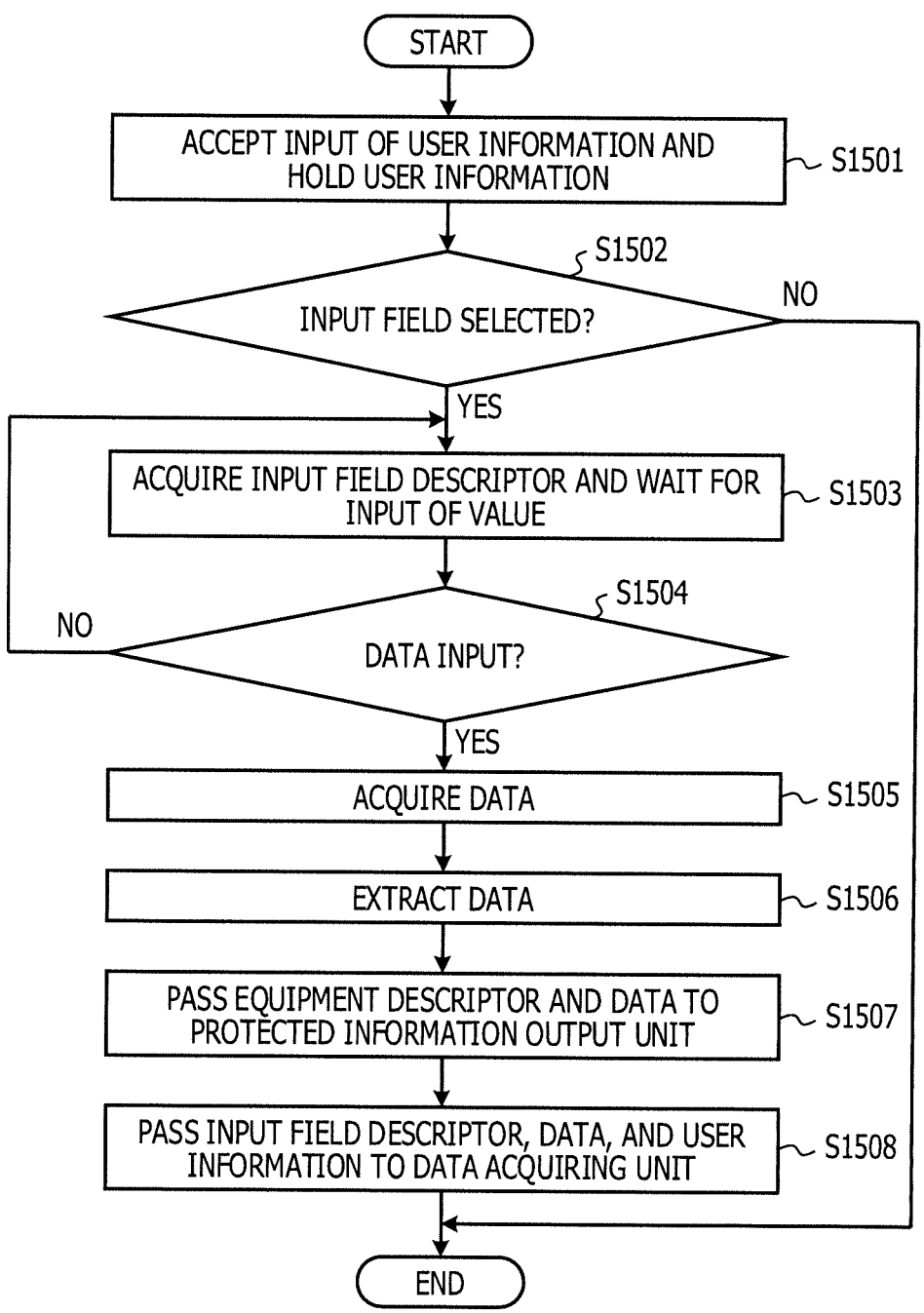
FIG. 15 is a flowchart for explaining operation of a driver for manual input.

Next, the operation of the driver 142 for manual input will be described with reference to FIG. 15. FIG. 15 is a flowchart for explaining operation of a driver for manual input.

In the terminal apparatus 100, the driver 142 for manual input in the present embodiment accepts input of the user information of the user who carries out input of data and holds the user information (step S1501).

Subsequently, the driver 142 for manual input determines whether or not selection of the input field has been accepted in the input screen of the terminal apparatus 100 (step S1502). If selection of the input field has not been accepted in the step S1502, the driver 142 for manual input ends the processing. Note that, at this time, the driver 142 for manual input may end the processing if selection of the input field is not accepted for a given time continuously.

If selection of the input field has been accepted in the step S1502, the driver 142 for manual input acquires the input field descriptor of the selected input field and waits for input of data (step S1503).

Subsequently, the driver 142 for manual input determines whether or not data has been input (step S1503). If data has not been input in the step S1504, the driver 142 for manual input waits until data is input.

If data has been input in the step S1504, the driver 142 for manual input acquires the data (step S1505) and extracts the data input from the input screen (step S1506).

Subsequently, the driver 142 for manual input passes the extracted data and the input field descriptor to the protected information output unit 137 (step S1507). Subsequently, the driver 142 for manual input passes the data, the input field descriptor, and the user information to the data acquiring unit 135 (step S1508) and ends the processing.

Figure 16:
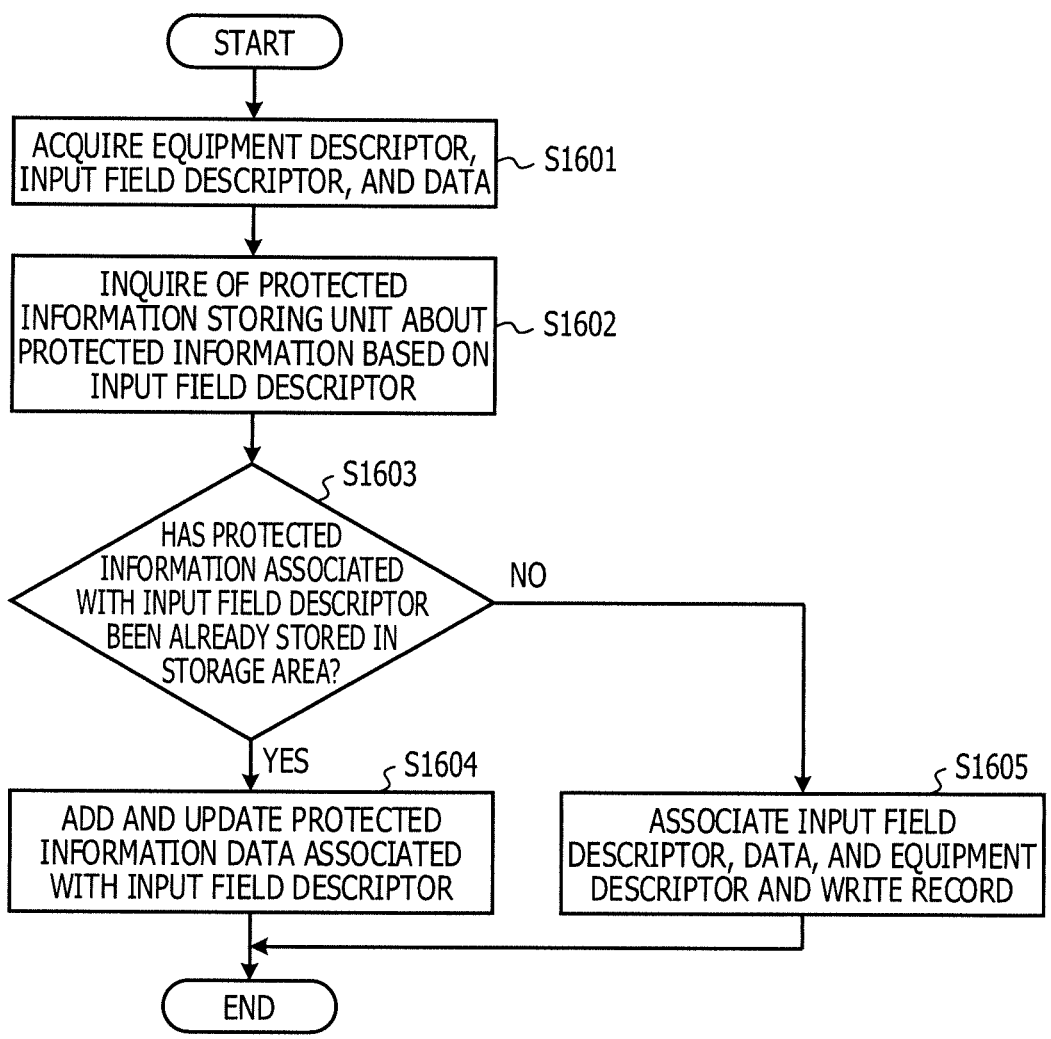
FIG. 16 is a flowchart for explaining processing of a protected information output unit.

Next, the processing of the protected information output unit 137 will be described with reference to FIG. 16. FIG. 16 is a flowchart for explaining processing of a protected information output unit.

The protected information output unit 137 of the present embodiment acquires a combination of the equipment descriptor, the input field descriptor, and the data or a combination of the input field descriptor and data (step S1601). Subsequently, based on the input field descriptor, the protected information output unit 137 inquires of the protected information storing unit 400 whether or not protected information including the identical input field descriptor exists (step S1602).

Subsequently, the protected information output unit 137 determines whether or not protected information associated with the identical input field descriptor exists in the protected information storing unit 400 (step S1603).

If the relevant protected information exists in the step S1603, when the equipment descriptor is included in the relevant protected information, the protected information output unit 137 updates the equipment descriptor of the relevant protected information and the data (step S1604) and ends the processing.

For example, the protected information output unit 137 associates the newly-acquired data and the equipment descriptor with the input field descriptor. Therefore, in this case, in the protected information storing unit 400, a first information set of data associated in the past and the equipment descriptor and a second information set of the data newly acquired in the step S1601 and the equipment descriptor are associated with the one input field descriptor. In this case, information on the date and time when the data is acquired may be acquired and be stored in the protected information storing unit 400 in association with the data. For example, in the protected information storing unit 400 of the present embodiment, the history of input of data regarding each input field descriptor is stored.

Note that, if the equipment descriptor is not included in the relevant protected information, the protected information output unit 137 updates the data of the relevant protected information similarly to the above-described method and ends the processing.

If the relevant protected information does not exist in the step S1603, the protected information output unit 137 generates one record in which the input field descriptor, the equipment descriptor, and the data are associated with each other and writes the record to the protected information storing unit 400 (step S1605) and ends the processing. If the equipment descriptor is not acquired in the step S1601, the protected information output unit 137 generates one record in which the input field descriptor is associated with the data, and ends the processing.

Figure 17:
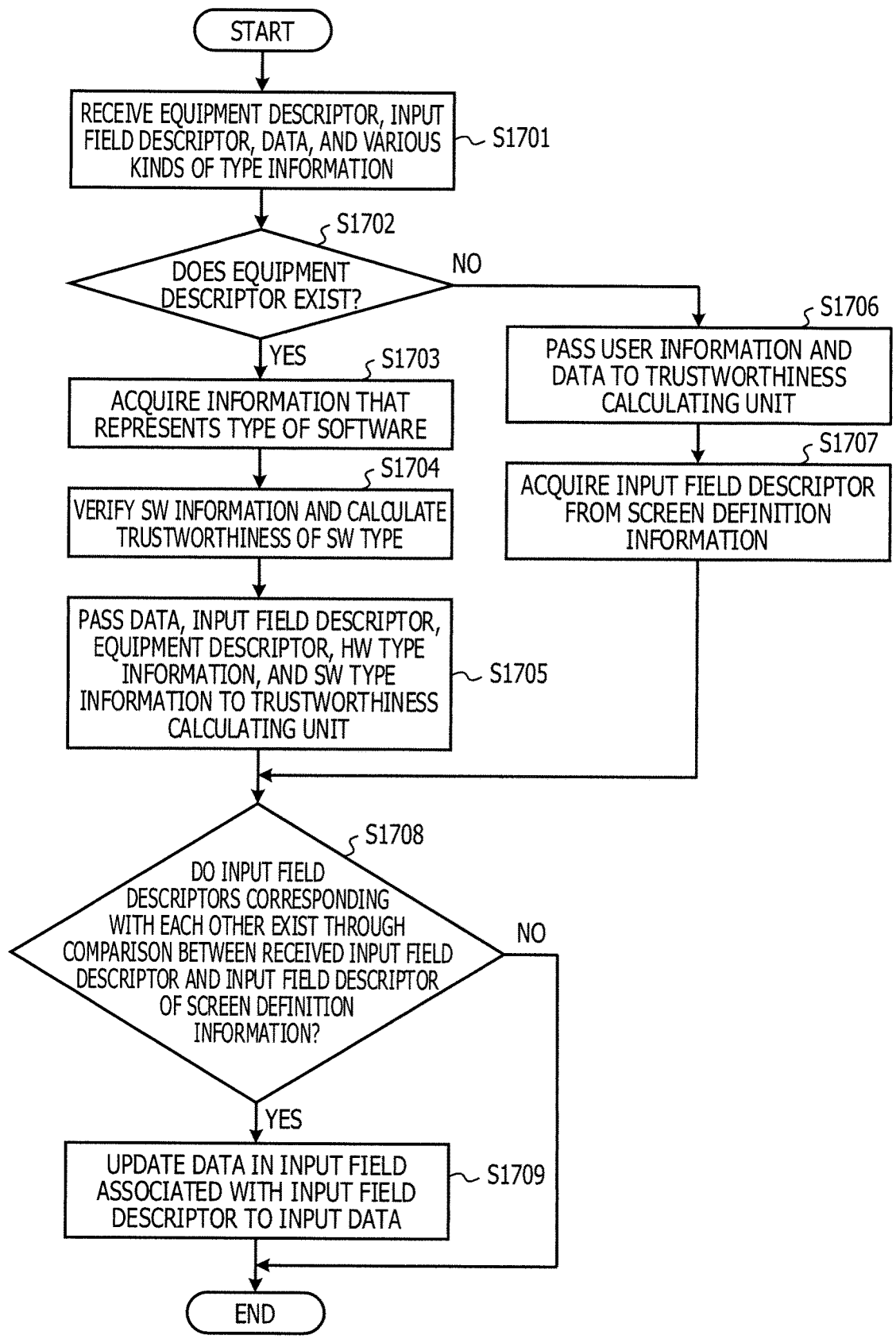
FIG. 17 is a flowchart for explaining processing of a data acquiring unit.

Next, the processing of the data acquiring unit 135 of the present embodiment will be described with reference to FIG. 17. FIG. 17 is a flowchart for explaining processing of a data acquiring unit.

The data acquiring unit 135 of the present embodiment acquires the equipment descriptor, the input field descriptor, the data, and various kinds of information (step S1701). For example, the data acquiring unit 135 acquires the equipment descriptor, the input field descriptor, the data, and the hardware type information from the driver 141 for equipment input. Furthermore, the data acquiring unit 135 acquires the input field descriptor, the data, and the user information from the driver 142 for manual input.

Subsequently, the data acquiring unit 135 determines whether or not the equipment descriptor has been acquired in the step S1701 (step S1702). If the equipment descriptor has not been acquired in the step S1702, the data acquiring unit 135 proceeds to a step S1706 to be described later.

If the equipment descriptor has been acquired in the step S1702, the data acquiring unit 135 acquires information that represents the type of the driver 141 for equipment input (software) (step S1703). The information that represents the type of the driver 141 for equipment input is the code signature of the driver 141 for equipment input or the like, for example.

Subsequently, the data acquiring unit 135 verifies the information that represents the type of the driver 141 for equipment input and acquires the trustworthiness of the driver 141 for equipment input to hold the trustworthiness as the software type information (step S1704). Details of the method for acquiring the trustworthiness of software will be described later.

Subsequently, the data acquiring unit 135 passes the data, the equipment descriptor, the input field descriptor, the hardware type information, and the software type information to the trustworthiness calculating unit 136 (step S1705) and proceeds to a step S1707 to be described later.

If the equipment descriptor has not been acquired in the step S1702, the data acquiring unit 135 passes the user information and the data to the trustworthiness calculating unit 136 (step S1706), followed by the step S1707.

The data acquiring unit 135 acquires the input field descriptor from the screen definition information (step S1707). Subsequently, the data acquiring unit 135 compares the input field descriptor acquired in the step S1707 and the input field descriptor acquired in the step S1701 and determines whether or not the input field descriptors corresponding with each other exist (step S1708).

If the input field descriptors corresponding with each other do not exist in the step S1708, the data acquiring unit 135 ends the processing.

If the input field descriptors corresponding with each other exist in the step S1708, the data acquiring unit 135 updates the data in the input field identified by the input field descriptor in the input screen to the input data (step S1709) and ends the processing.

Figure 18:
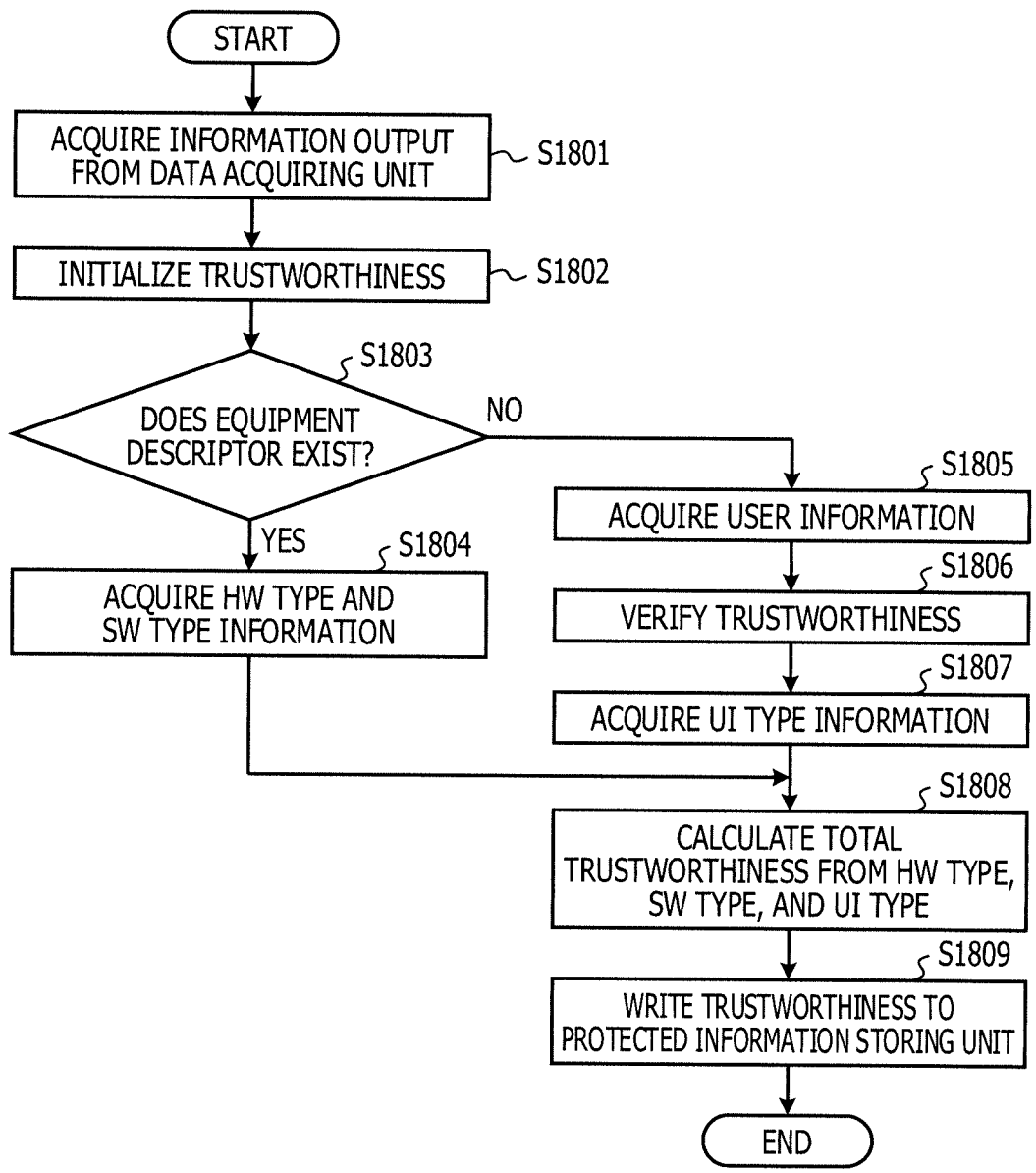
FIG. 18 is a flowchart for explaining processing of a trustworthiness calculating unit.

Next, the processing of the trustworthiness calculating unit 136 will be described with reference to FIG. 18. FIG. 18 is a flowchart for explaining processing of a trustworthiness calculating unit.

The trustworthiness calculating unit 136 acquires information output from the data acquiring unit 135 (step S1801). Subsequently, the trustworthiness calculating unit 136 acquires the input field descriptor from the screen definition information and initializes the trustworthiness of data corresponding to the input field descriptor (step S1802).

Subsequently, the trustworthiness calculating unit 136 determines whether or not the equipment descriptor is included in the information acquired in the step S1801 (step S1803).

If the equipment descriptor is included in the step S1803, the trustworthiness calculating unit 136 acquires the hardware type information and the software type information from the information acquired in the step S1801 (step S1804) and proceeds to a step S1808 to be described later.

If the equipment descriptor is not included in the step S1803, the trustworthiness calculating unit 136 acquires the user information from the information acquired in the step S1801 (step S1805). Subsequently, the trustworthiness calculating unit 136 verifies the trustworthiness of the user who has input data based on the user information (step S1806) and acquires the trustworthiness of the user to hold the trustworthiness as the user type information (step S1807).

The acquisition of the trustworthiness of the user will be described below.

The authority, post and so forth of the user are included in the user information. Thus, the trustworthiness calculating unit 136 may acquire the trustworthiness of the user with reference to a table or the like in which the authority, post and so forth of the user are associated with the trustworthiness. For example, the trustworthiness is higher for a user whose post is an executive than a user whose post is a rank-and-file employee.

Subsequently, the trustworthiness calculating unit 136 calculates the trustworthiness of the input data by using the hardware type information, the software type information, and the user type information (step S1808).

The calculation of the trustworthiness of the input data will be described below. In the present embodiment, the trustworthiness of the input data is calculated by the following expression.

Trustworthiness=$\Sigma$(hardware type information×weight coefficient)+$\Sigma$(software type information×weight coefficient)+$\Sigma$(user type information×weight coefficient)

Note that suppose that the trustworthiness calculating unit 136 of the present embodiment includes a weight table in which each of the type information is associated with the weight coefficient regarding each of the hardware type information, the software type information, and the user type information.

In the weight table, for example, the kind of verification carried out for calculating the hardware type information, the software type information, or the user type information may be associated with the weight coefficient.

Subsequently, the trustworthiness calculating unit 136 associates the calculated trustworthiness of the data with the input field descriptor corresponding with the input field descriptor acquired in the step S1801 and stores the trustworthiness in the protected information storing unit 400 (step S1809) and ends the processing.

As described above, in the present embodiment, the input field descriptor, data input to the input field identified by the input field descriptor, and the trustworthiness of the data are associated with each other and are stored in the protected information storing unit 400.

Figure 19:
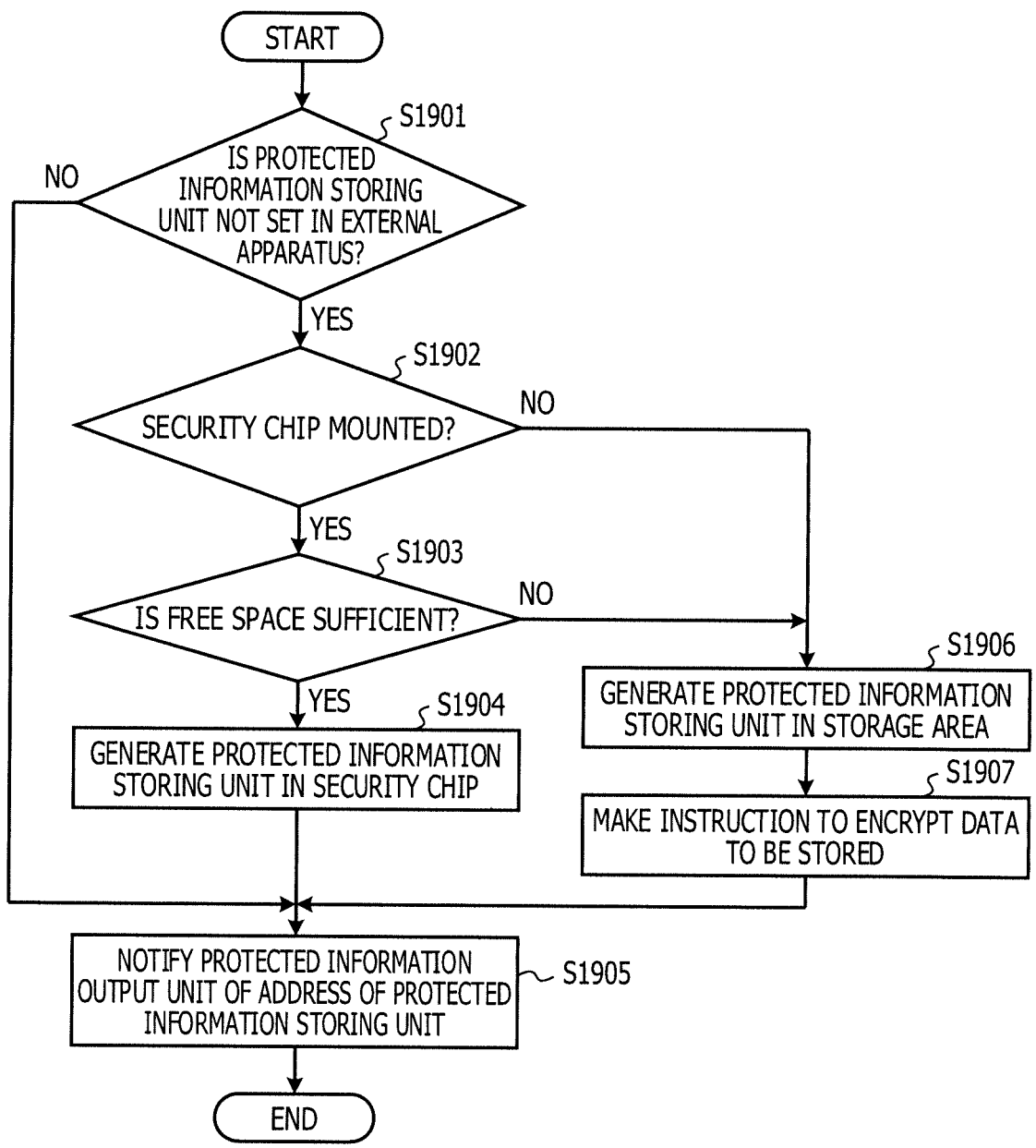
FIG. 19 is a flowchart for explaining processing of a protection area generating unit.

Next, the processing of the protection area generating unit 138 will be described with reference to FIG. 19. FIG. 19 is a flowchart for explaining processing of a protection area generating unit.

The protection area generating unit 138 of the present embodiment determines whether or not the protected information storing unit 400 is set in external apparatus of the terminal apparatus 100 (step S1901). If the protected information storing unit 400 is set in external apparatus in the step S1901, the protection area generating unit 138 proceeds to a step S1905 to be described later.

If the protected information storing unit 400 is not set in external apparatus in the step S1901, the protection area generating unit 138 determines whether or not a security chip is mounted in the terminal apparatus 100 (step S1902). If a security chip is not mounted in the step S1902, the protection area generating unit 138 proceeds to a step S1906 to be described later.

If a security chip is mounted in the step S1902, the protection area generating unit 138 determines whether or not the free space of the security chip is sufficient in setting the protected information storing unit 400 (step S1903). Note that the free space for setting of the protected information storing unit 400 may be set in the protection area generating unit 138 in advance.

If the free space is insufficient in the step S1903, the protection area generating unit 138 proceeds to the step S1906 to be described later.

If the free space is sufficient in the step S1903, the protection area generating unit 138 generates the protected information storing unit 400 in the security chip (step S1904). Subsequently, the protection area generating unit 138 notifies the protected information output unit 137 of the address of the protected information storing unit 400 (step S1905) and ends the processing.

If a security chip is not mounted in the step S1902 or if the free space is insufficient in the step S1903, the protection area generating unit 138 generates the protected information storing unit 400 in the storage area of the terminal apparatus 100 (step S1906). Subsequently, the protection area generating unit 138 instructs the protected information output unit 137 to encrypt data to be stored in the protected information storing unit 400 (step S1907) and proceeds to the step S1905.

Figure 20:
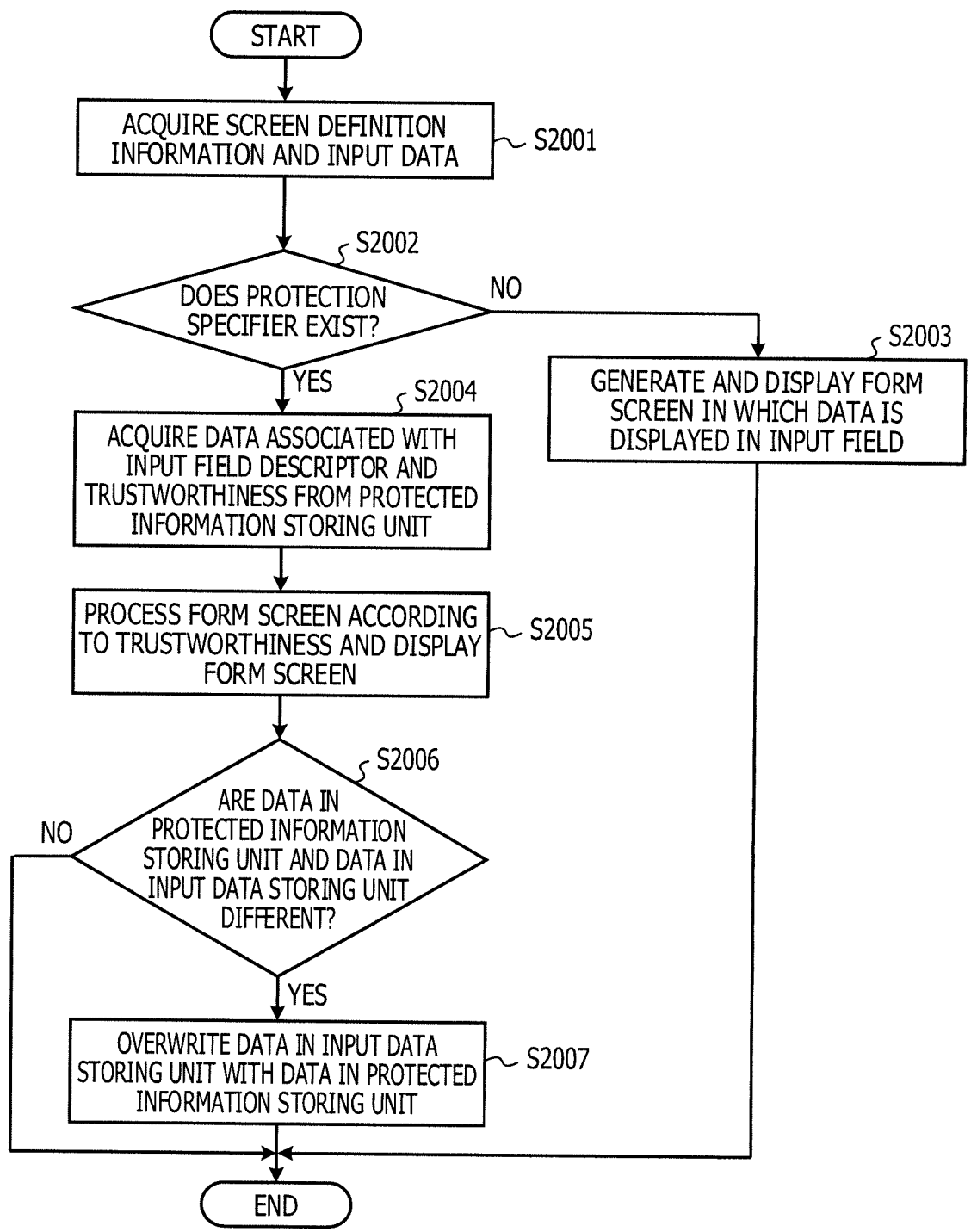
FIG. 20 is a flowchart for explaining processing of a form generating unit.

Next, the processing of the form generating unit 139 will be described with reference to FIG. 20. FIG. 20 is a flowchart for explaining processing of a form generating unit.

When receiving a request for display of the form screen, the form generating unit 139 of the present embodiment acquires the screen definition information and input data (step S2001). For example, the form generating unit 139 extracts the input field descriptor included in the acquired screen definition information and acquires data associated with the input field descriptor in the input data storing unit 300.

Subsequently, the form generating unit 139 determines whether or not the data is deemed as a protection subject based on the protection specifier of the screen definition information (step S2002). If the data is not deemed as a protection subject in the step S2002, the form generating unit 139 generates screen data of the form screen in which the acquired data is displayed in the input field and causes the terminal apparatus 100 to display the form screen (step S2003) and ends the processing.

If the data is deemed as a protection subject in the step S2002, the form generating unit 139 acquires data associated with the input field descriptor acquired in the step S2001 and the trustworthiness of the data from the protected information storing unit 400 (step S2004).

Subsequently, the form generating unit 139 causes the data acquired from the protected information storing unit 400 to be displayed in the input field identified by the input field descriptor. Furthermore, the form generating unit 139 generates screen data of the form screen on which processing according to the trustworthiness is made and causes the terminal apparatus 100 to display the form screen (step S2005). For example, in the case in which the trustworthiness of the data displayed in the input field is low or the like, the form generating unit 139 causes a display part indicating that the trustworthiness is low to be displayed in the form screen.

Subsequently, the form generating unit 139 compares the data associated with the input field descriptor acquired in the step S2001 in the input data storing unit 300 and the data associated with the input field descriptor in the protected information storing unit 400 (step S2006). If both correspond with each other in the step S2006, the form generating unit 139 ends the processing.

If both are different in the step S2006, the form generating unit 139 overwrites the relevant data in the input data storing unit 300 with the relevant data in the protected information storing unit 400 (step S2007) and ends the processing.

Furthermore, in the present embodiment, operation to the display part is accepted and the data corresponding to the input field descriptor in the protected information storing unit 400 is displayed in the form screen. Details of the processing according to the trustworthiness by the form generating unit 139 will be described later.

As described above, if the data corresponding to the input field is deemed as a protection subject, the form generating unit 139 of the present embodiment causes data stored in the protected information storing unit 400, which is a storage area in which editing is impossible, to be displayed in the form screen. Due to this, in the present embodiment, editing by manual input on the data displayed in the input field of the form screen is prohibited. For example, in the present embodiment, falsification of data in the form screen may be suppressed.

Furthermore, if the trustworthiness of data stored in the protected information storing unit 400 is low, the form generating unit 139 causes a display part indicating that effect to be displayed in the form screen.

Therefore, according to the present embodiment, whether or not there is a possibility that displayed data is falsified data may be presented to a viewer of the form screen.

Next, the calculation of the trustworthiness of the hardware and the trustworthiness of the software in the present embodiment will be described.

The trustworthiness of the hardware is what is obtained by calculating, as a value, the result of verification of the trustworthiness of the utilization equipment 200 itself from information on the utilization equipment 200 by the driver 141 for equipment input.

A security chip that is called a trusted platform module (TPM) and has tamper resistance is often embedded in the utilization equipment 200. In this case, the validity of the utilization equipment 200 is ensured by the TPM.

The driver 141 for equipment input evaluates the trustworthiness of the utilization equipment 200 by acquiring certificate information indicating that the TPM ensures the validity of the utilization equipment 200 from the utilization equipment 200 and verifying whether or not this certificate information is valid by using a method such as a public key signature.

At this time, in conjunction with the TPM, the driver 141 for equipment input dynamically verifies hardware configuration information of the utilization equipment 200 and checks whether or not a trouble such as failure exists. Then, the driver 141 for equipment input calculates the trustworthiness of the hardware by combining these pieces of information.

Next, the calculation of the trustworthiness of the software will be described.

The trustworthiness of the software may be verified based on whether or not verification information of the signature of the driver 141 for equipment input and the form program 110 are being executed on a sandbox, whether or not the verification information and the form program 110 are operating in a secure and reliable execution environment, and so forth.

For example, the trustworthiness of the software is what is obtained by calculating, as a value, the result of verification of the trustworthiness of the path until data input to the utilization equipment 200 reaches the form processing unit 130 from information on the system on which the driver 141 for equipment input and a device driver operate, and so forth.

For example, the driver 141 for equipment input is basically software that is provided as a tool application by the equipment manufacturer and is compatible with the utilization equipment 200, and is often given a code signature in order to suppress fraudulent analysis, falsification and so forth of the driver 141 for equipment input.

The data acquiring unit 135 of the embodiment may evaluate the trustworthiness of the driver 141 for equipment input by verifying whether this code signature is a signature certainly added by the equipment manufacturer.

Furthermore, in recent years, techniques of virtualization and weight reduction of the driver 141 for equipment input have been advanced and a framework that enables a tool application equivalent to the driver 141 for equipment input to be dynamically inserted and removed has also existed. In this case, it is also possible to verify the trustworthiness with the code signature and configuration of such a framework itself, and the trustworthiness of the software (driver 141 for equipment input) may be calculated by combining these pieces of information.

Next, the calculation of the trustworthiness of the user will be described.

The trustworthiness of the user is what is obtained by calculating, as a value, the result of determination of the user who is making manual input on the terminal on which the form program 110 operates and evaluation of the trustworthiness of the input value itself from information on the department, specialty and so forth of the user in the trustworthiness calculating unit 136.

Basically the terminal apparatus 100 is operated as a terminal exclusively for each user in many cases. Therefore, in the present embodiment, the terminal ID and user information of the terminal apparatus 100 are set in the terminal apparatus 100 in advance. This allows the trustworthiness calculating unit 136 to determine the trustworthiness of the user who inputs data in the form.

Furthermore, for example, if user authentication may be carried out to the user (person who makes input) at the time of input of data, the trustworthiness calculating unit 136 is allowed to identify the user who is inputting data and verify the user information.

The trustworthiness calculating unit 136 may calculate the trustworthiness of the user by acquiring the user information by using these methods and extracting information on the department, the specialty and so forth for calculating the trustworthiness of the user from the user information.

In the trustworthiness calculating unit 136 of the present embodiment, the trustworthiness is calculated as follows based on the trustworthiness of the hardware (hardware type information), the trustworthiness of the software (software type information), the trustworthiness of the user (user type information) and so forth, for example.

Trustworthiness=verification result of TPM signature×50+verification result of signature of driver for equipment input×30+verification result of validity of log×10+verification result of measurement time and place×10

In the present embodiment, for example, if the value of the trustworthiness is equal to or smaller than 50, a display part indicating that the trustworthiness is low may be added in the form screen.

Furthermore, in the present embodiment, an error message may be displayed in the input screen if the trustworthiness does not surpass a given threshold.

Figure 21:
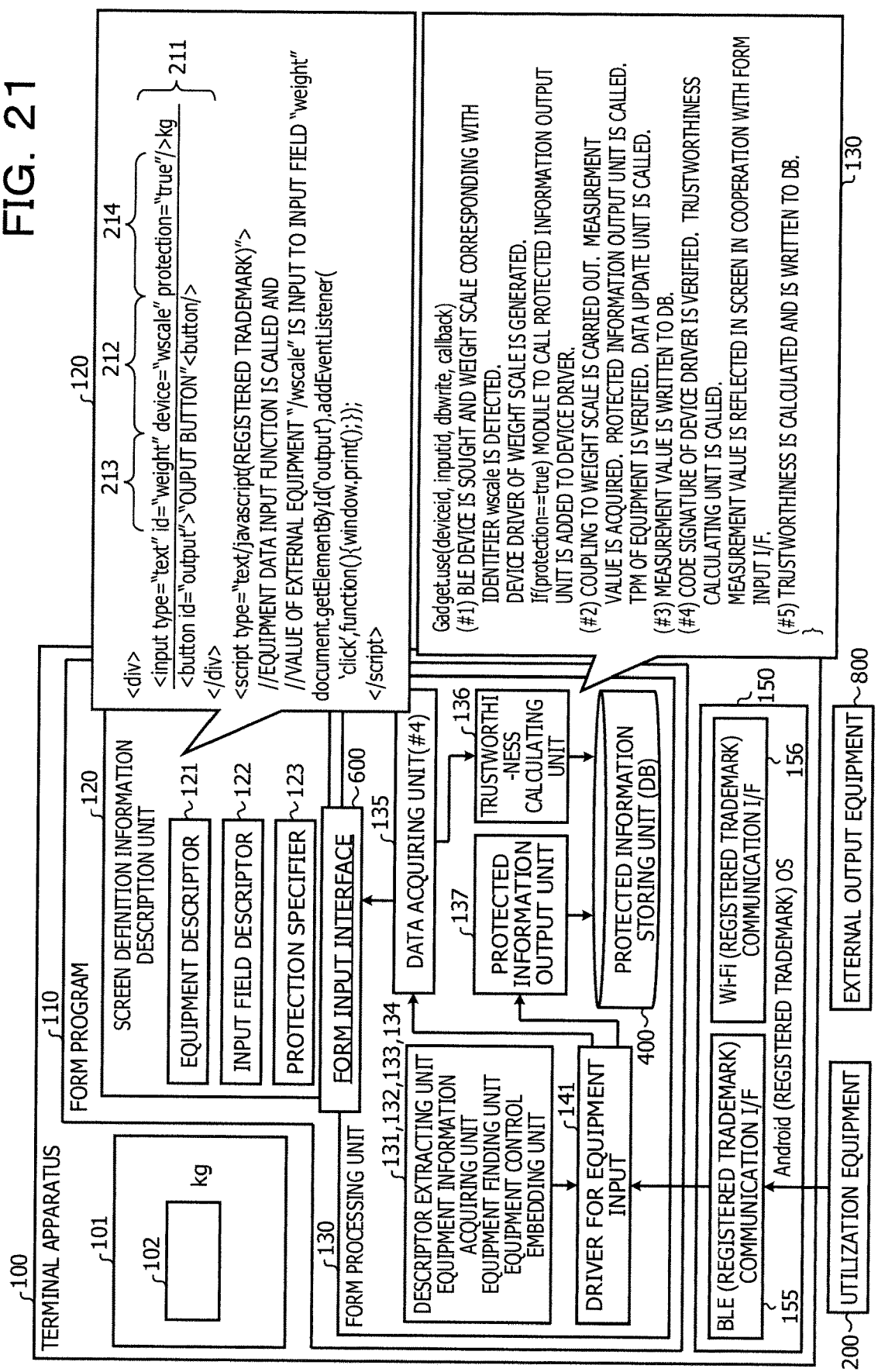
FIG. 21 is a diagram for explaining descriptions relating to input of data in a form program of the first embodiment.

Next, descriptions that represent the form program 110 of the present embodiment will be described. FIG. 21 is a diagram for explaining descriptions relating to input of data in a form program of the first embodiment.

The terminal apparatus 100 of the present embodiment is a terminal equipped with an Android® operating system (OS) or the like, for example.

The form program 110 operates with dividing into the screen definition information description unit 120 and the form processing unit 130. In the example of FIG. 21, it is assumed that the form processing unit 130 uses Cordova as one kind of framework of an Android application. Furthermore, it is assumed that the screen definition information description unit 120 operates in the framework of Cordova.

Furthermore, suppose that the terminal apparatus 100 of the present embodiment is provided with a BLE communication interface 155, a wireless fidelity (Wi-Fi) communication interface 156 and so forth as a communication interface 150.

The screen definition information is described by the hypertext markup language (HTML). In the screen definition information description unit 120, a description 211 surrounded by <div> to </div> tags represents the screen definition information.

In the description 211, a description 212 represents the equipment descriptor 121, a description 213 represents the input field descriptor 122, and a description 214 represents the protection specifier 123. If the value of "protection" is "true" in the description 214, data input to the input field identified by the input field descriptor is deemed as a protection subject. Furthermore, if the value of "protection" is "false" in the description 214, data input to the input field identified by the input field descriptor is not protected.

When the form program 110 is activated in the terminal apparatus 100, the form processing unit 130 automatically loads a JavaScript (registered trademark) interface 600. The JavaScript interface 600 includes a form input interface and a form output interface and causes the form processing unit 130 to carry out functions of input of data and output of the form.

The form input interface 600 is automatically carried out at the time of activation of the form program 110. In the form program 110 of the present embodiment, a Gadget.use function represented in a description 215 is called and thereby functions of the form processing unit 130 are carried out.

The functions possessed by the form processing unit 130 of the present embodiment may be implemented as a plug-in of Cordova. The functions possessed by the form processing unit 130 are as described above.

Figure 22:
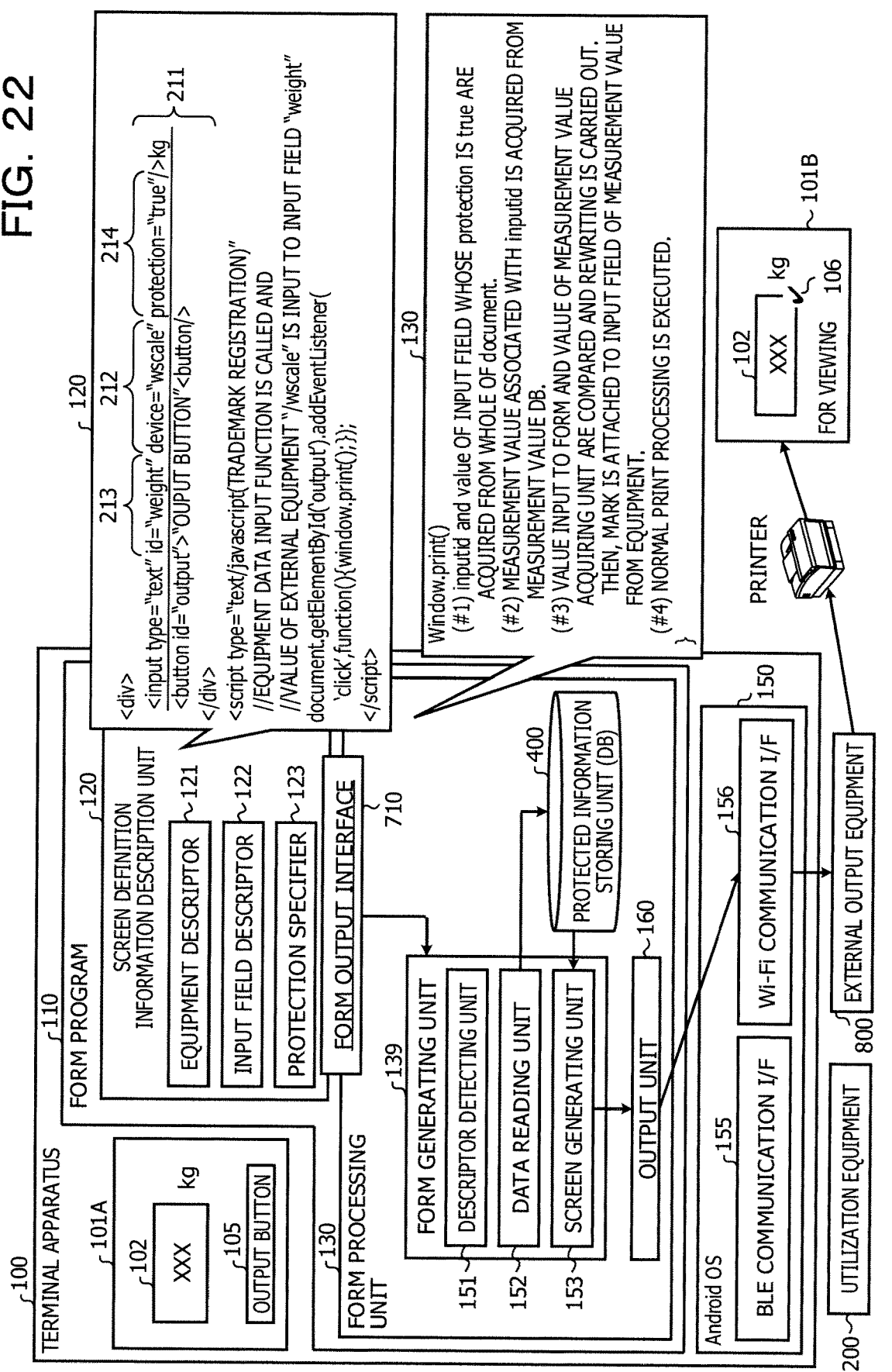
FIG. 22 is a diagram for explaining descriptions relating to output of data in a form program of the first embodiment.

FIG. 22 is a diagram for explaining descriptions relating to output of data in a form program of the first embodiment.

In FIG. 22, the case in which a button 105 with which an instruction to print a form screen 101A is made is operated in the form screen 101A in which data is input to the input field 102 will be described.

When the button 105 is operated in the form screen 101A, a form output interface 710 carries out the form generating unit 139 before a general-purpose output function is carried out.

For example, in the form processing unit 130, the form generating unit 139 and the output unit 160 are called by window.print( ) represented by a description 221, with the click of the button 105 serving as the trigger.

In the present embodiment, a viewed screen 101B is generated and displayed before print processing is executed in an external output equipment 800. Note that the viewed screen is one of screens displayed in the process of printing the form, for example, and may be displayed in order to verify whether or not falsification of input data exists.

In the form generating unit 139 of the present embodiment, the descriptor detecting unit 151 acquires the "input" element in the description 211 representing the screen definition information of the form screen 101A and detects the element whose protection specifier is "true" to acquire "id" and "value" of the "input" element.

In the data reading unit 152, an inquiry to the protected information storing unit 400 is made about "value" (data) corresponding to acquired "id" (input field descriptor) and the data associated with "id" is acquired.

In the screen generating unit 153, the data acquired from the protected information storing unit 400 and a "value" value stored in the input data storing unit 300 are compared. If both are different, the "value" value of the input data storing unit 300 is overwritten with the value of "value" associated with "id."

Furthermore, for example, if the equipment descriptor 121 is included in the screen definition information, the screen generating unit 153 may display a display part 106 indicating that the data is data input from the utilization equipment 200 in the viewed screen 101B. Displaying the display part 106 in the viewed screen 101B allows the viewer to understand that the data displayed in the viewed screen 101B is data input by the utilization equipment 200.

Note that, in the example of FIG. 22, a check mark is employed as the display part 106. However, the display part 106 is not limited thereto. The form of the display part 106 may be an alphabet or a number or may be a mark such as a circle or a square.

Figure 23:
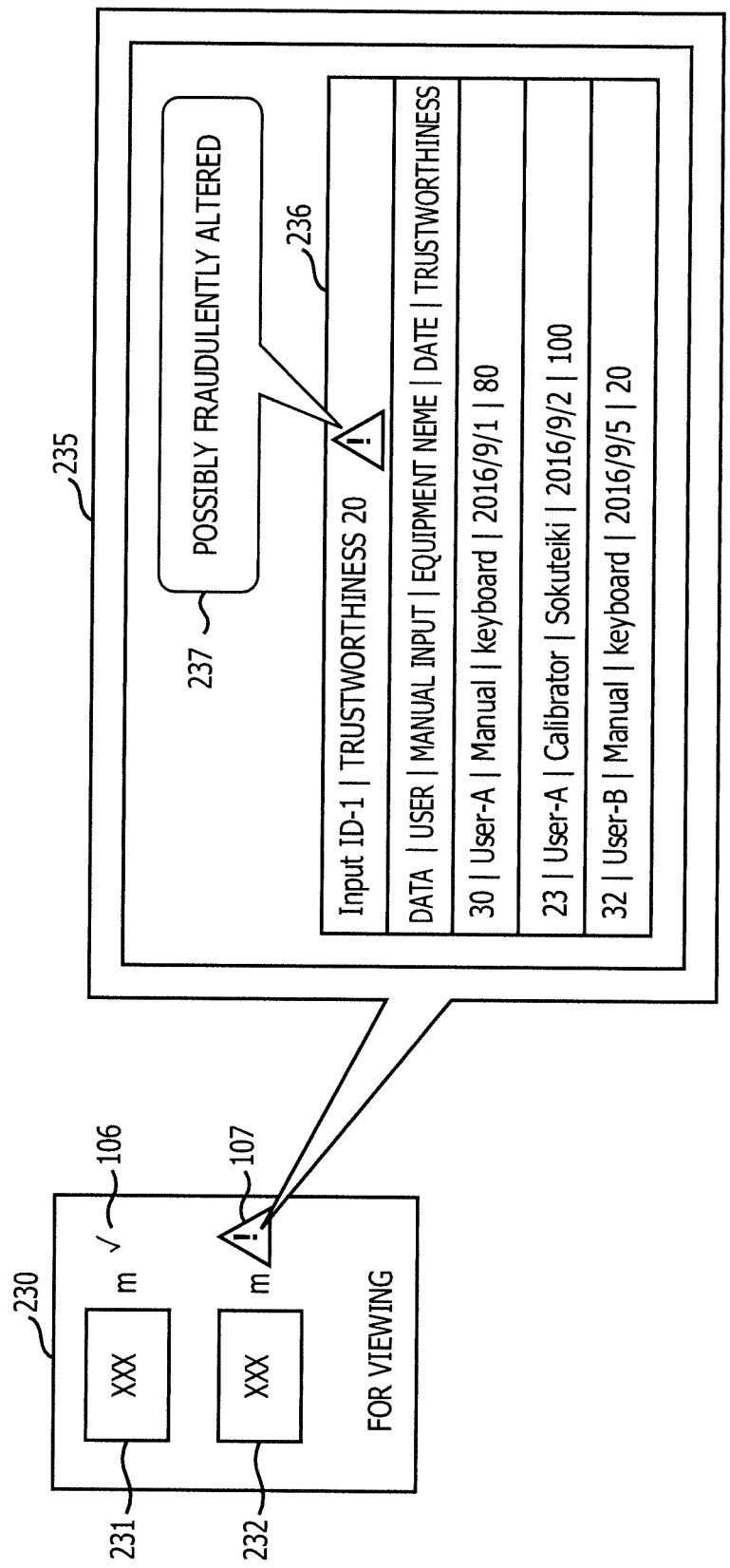
FIG. 23 is a first diagram illustrating an example in which a viewed screen of the first embodiment is displayed.

Next, display of the viewed screen of the present embodiment will be described with reference to FIG. 23 and FIG. 24. FIG. 23 is a first diagram illustrating an example in which a viewed screen of the first embodiment is displayed.

A viewed screen 230 illustrated in FIG. 23 includes input fields 231 and 232 and pieces of data input to the respective input fields are displayed.

Furthermore, in the viewed screen 230, the display part 106 indicating that the data is data input by the utilization equipment 200 is displayed near the input field 231. Thus, it turns out that the data displayed in the input field 231 is data input by the utilization equipment 200.

Moreover, in the viewed screen 230, a display part 107 indicating that the trustworthiness of the data displayed in the input field 232 does not reach a given threshold is displayed near the input field 232. Therefore, it turns out that there is a possibility that the data displayed in the input field 232 is not data input by a valid method.

In the present embodiment, when operation of selecting the display part 107 is accepted in the viewed screen 230, the display of the terminal apparatus 100 is shifted from the viewed screen 230 to a verification screen 235. The verification screen 235 may be displayed on the viewed screen 230 in a pop-up style or the like.

In the verification screen 235, a table 236 that represents the history of input of data to the input field 232 and a message 237 that informs that data possibly involves fraudulent altering are displayed.

The table 236 includes the value of data, user, manual input, equipment name, date, and trustworthiness as items of information. The items "data," "date," "equipment name," and "trustworthiness" are acquired from the protected information storing unit 400. Note that the item "equipment name" may be acquired from the equipment descriptor in protected information stored in the protected information storing unit 400. Note that, for example, the table 236 of the present embodiment is a list of data associated with the input field descriptor of the input field 232 in the protected information storing unit 400.

The value of the item "user" represents the user who has input data. In the example of FIG. 23, it turns out that the user information is acquired in both the case in which data input is carried out by manual input and the case in which data input is carried out by the utilization equipment 200.

The value of the item "manual input" indicates whether data input has been carried out by manual input or been carried out by the utilization equipment 200. If the value of the item "manual input" is "Manual," this indicates that the data has been manually input with the terminal apparatus 100.

Therefore, according to the table 236 illustrated in FIG. 23, it turns out that the trustworthiness of data manually input to the input field 232 by user A with a keyboard on 2016 Sep. 1 is 80. Furthermore, according to the table 236, it turns out that the trustworthiness of data input to the input field 232 by user A by using a measuring instrument on 2016 Sep. 2 is 100. Moreover, according to the table 236, it turns out that the trustworthiness of data manually input to the input field 232 by user B on 2016 Sep. 5 is 20.

Therefore, the viewer of the viewed screen 230 may understand whether or not editing of data to the input field 232 has been carried out and who has carried out editing. In the example of FIG. 23, it may be verified that the data input by user B is likely to be fraudulent altering.

Figure 24:
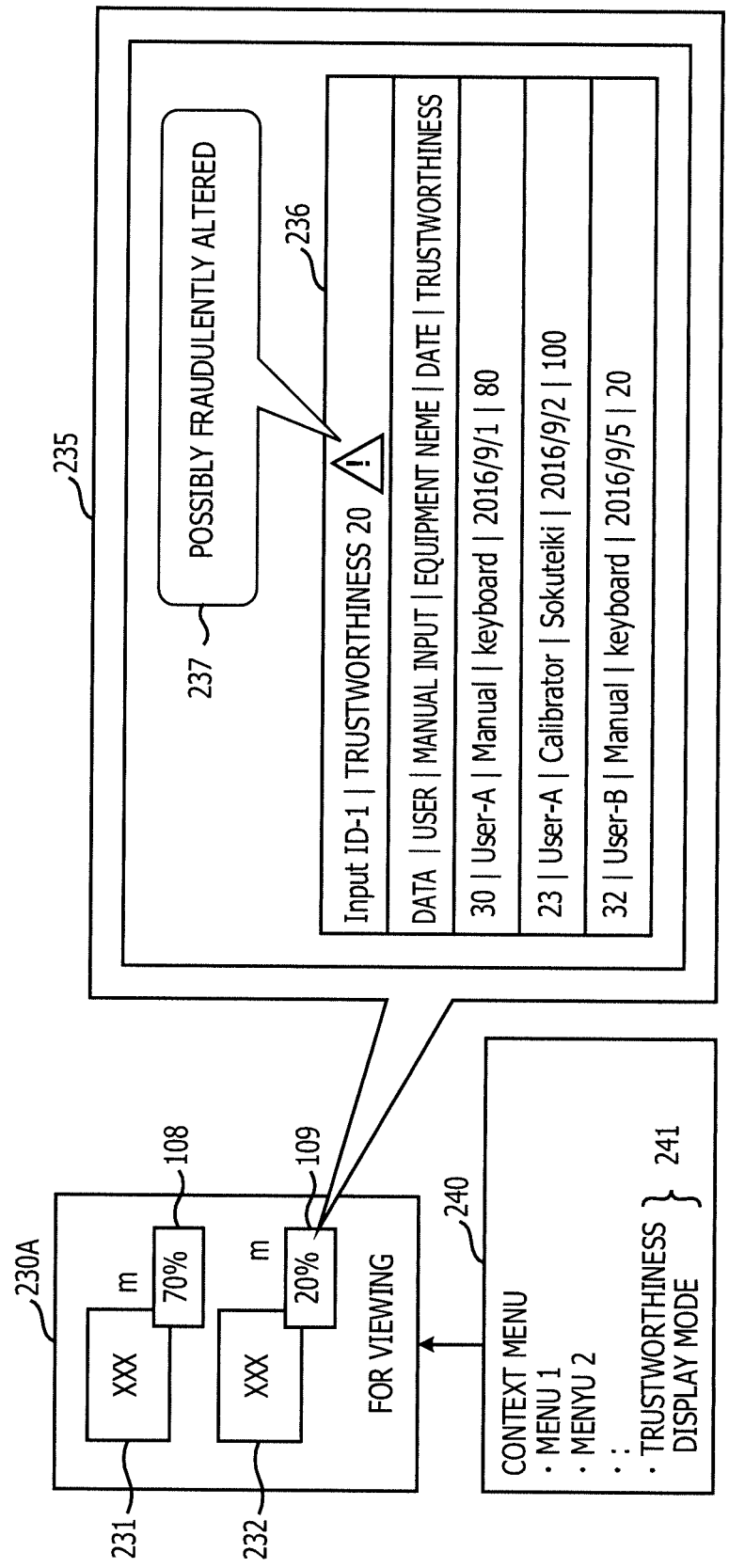
FIG. 24 is a second diagram illustrating an example in which a viewed screen of the first embodiment is displayed.

FIG. 24 is a second diagram illustrating an example in which a viewed screen of the first embodiment is displayed.

In a viewed screen 230A illustrated in FIG. 24, the trustworthiness of displayed data is displayed regarding each input field.

The viewed screen 230A includes the input fields 231 and 232 and pieces of data input to the respective input fields are displayed. Furthermore, in the viewed screen 230A, a display part 108 that represents the trustworthiness of data displayed in the input field 231 and a display part 109 that represents the trustworthiness of data displayed in the input field 232 are displayed in association with the respective input fields.

Therefore, in the viewed screen 230A, it turns out that the trustworthiness of the data input to the input field 232 is low. In the example of FIG. 24, when operation of selecting the display part 109 associated with the input field 232 is carried out, the display of the terminal apparatus 100 is shifted from the viewed screen 230A to the verification screen 235 including the table 236 and the message 237.

In the present embodiment, a menu screen 240 with which the mode of display of the form and so forth are set may be displayed in the terminal apparatus 100. Furthermore, in the present embodiment, the trustworthiness of data may be displayed regarding each input field as in the viewed screen 230A when operation of setting a trustworthiness display mode 241 as the mode of the display of the form is carried out in the menu screen 240.

As described above, according to the present embodiment, the trustworthiness of data input to the input field of the form is calculated and held. Therefore, according to the present embodiment, it is possible to cause verification of whether or not fraudulent altering has been carried out according to the trustworthiness after data is input to the input field.

Furthermore, according to the present embodiment, it is possible to determine whether data has been input by the utilization equipment 200 or been manually input based on whether or not the data is associated with the equipment descriptor. Therefore, according to the present embodiment, it is possible to show the viewer which data is a value input as a measurement value by the utilization equipment 200 and which data is a value directly input by a user with the terminal apparatus 100 in the history of input of data.

Moreover, according to the present embodiment, when the form is output, data stored in the protected information storing unit 400 is output as data corresponding to the input field. Therefore, according to the present embodiment, editing of data to the form may be prohibited. Furthermore, according to the present embodiment, a value that is not edited after acquisition of data may be reflected in the form. For example, according to the present embodiment, data input to the input field may be output to the form as it is.

Second Embodiment

A second embodiment will be described below with reference to drawings. The second embodiment is different from the first embodiment in that a protected information storing unit 400A is provided outside the terminal apparatus 100. Thus, in the following description of the second embodiment, only the difference from the first embodiment will be described and what has similar functional configuration as the first embodiment is given similar numeral as the numeral used in the description of the first embodiment and description thereof is omitted.

Figure 25:
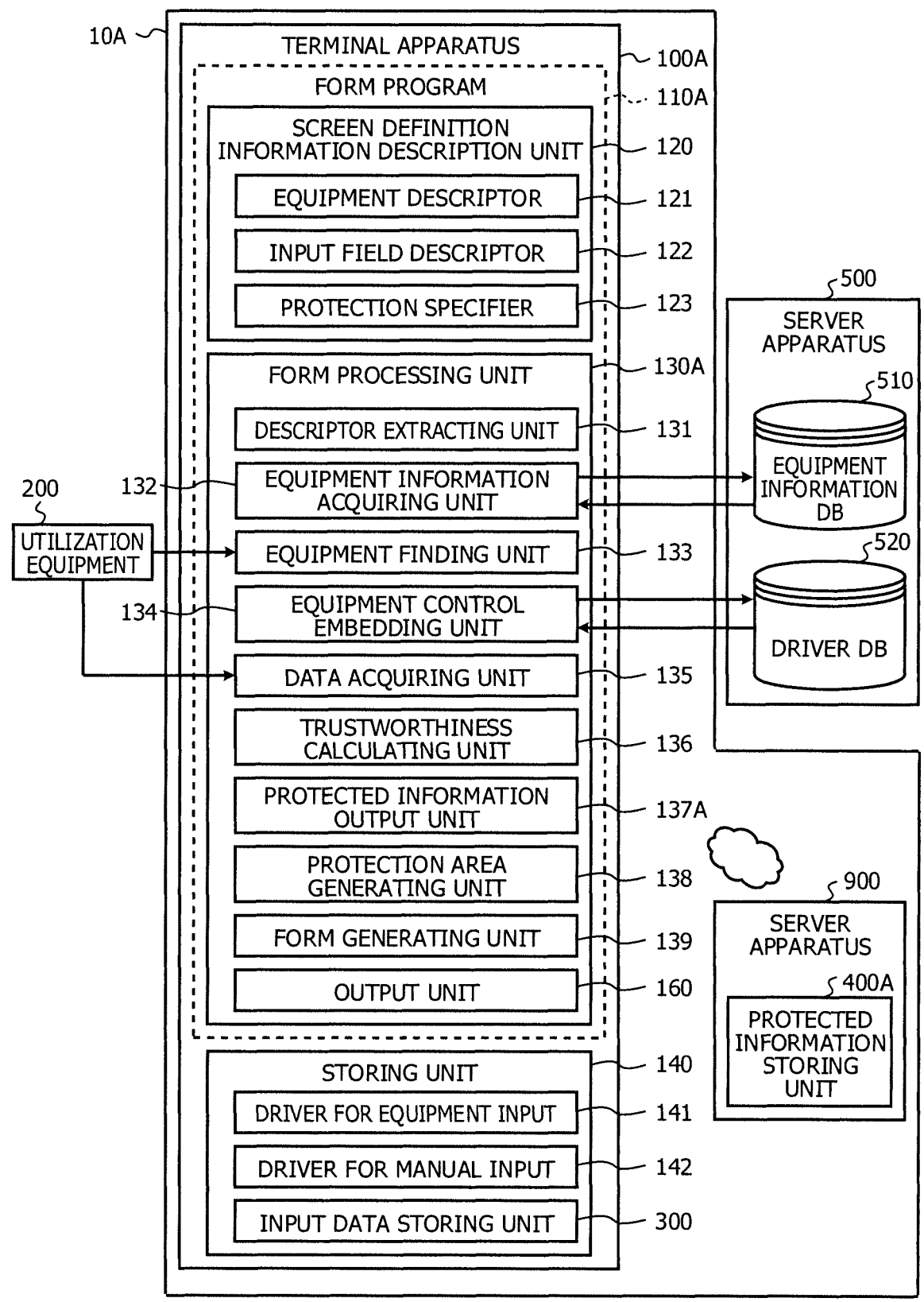
FIG. 25 is a diagram for explaining functions of a terminal apparatus of a second embodiment.

FIG. 25 is a diagram for explaining functions of a terminal apparatus of the second embodiment. A terminal apparatus 100A of the present embodiment includes a form program 110A. The form program 110A is stored in a memory of the terminal apparatus 100A and is executed by a processor of the terminal apparatus 100A to implement a form processing unit 130A. For example, the processor of the terminal apparatus 100A executes the form program 110A stored in the memory and thereby is converted to a hardware circuit that executes processing relating to the form processing unit 130A.

The form processing unit 130A includes a protected information output unit 137A. The protected information output unit 137A transmits information acquired from the driver 141 for equipment input or the driver 142 for manual input to the protected information storing unit 400A provided in a server apparatus 900. The server apparatus 900 is an apparatus coupled to the terminal apparatus 100A through a network. A form system 10A includes the terminal apparatus 100A and the server apparatus 900.

Next, a viewed screen displayed on the terminal apparatus 100A of the present embodiment will be described with reference to FIG. 26 and FIG. 27.

Figure 26:
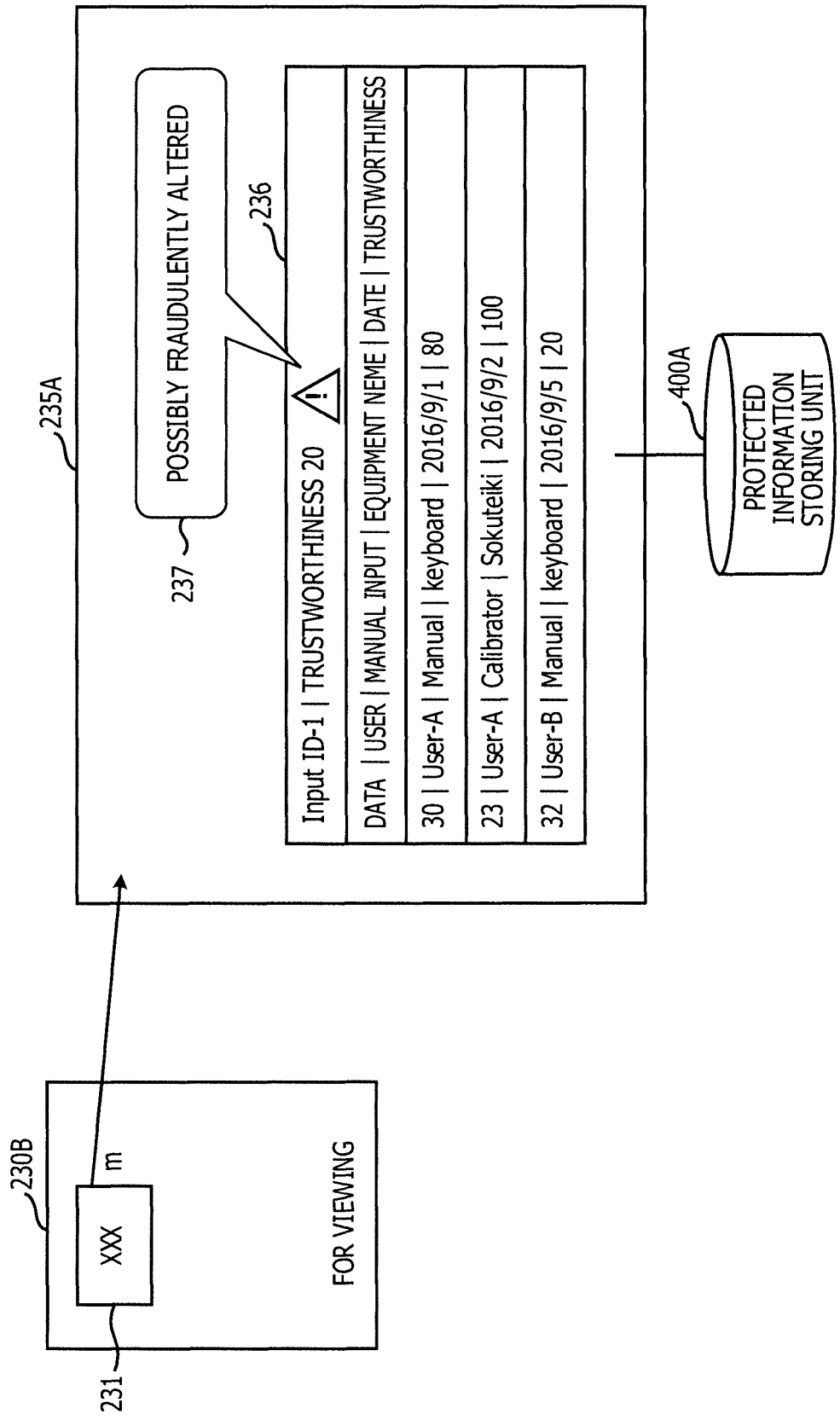
FIG. 26 is a first diagram illustrating an example in which a viewed screen of the second embodiment is displayed.

FIG. 26 is a first diagram illustrating an example in which a viewed screen of the second embodiment is displayed. In the example of FIG. 26, when operation of selecting the input field 231 is carried out in a viewed screen 230B, a verification window 235A is displayed by a different application from the screen displayed by the form program 110A.

In the present embodiment, an existing viewer application such as a portable document format (PDF) viewer or a browser may be used in order to display the verification window 235A by an application other than the form program 110A in this manner. This may enhance the general versatility.

The verification window 235A may be displayed on the terminal apparatus 100A through generation of screen data based on the protected information storing unit 400A in the server apparatus 900. Furthermore, the verification window 235A may be displayed on the terminal apparatus 100A through acquisition of information that is stored in the protected information storing unit 400A and represents the history of data to the input field 231 by the terminal apparatus 100A from the server apparatus 900 through a network and generation of screen data by the form generating unit 139.

In the verification window 235A, the table 236 that represents the history of data to the input field 231 and the message 237 indicating that data possibly involves fraudulent altering are displayed.

Note that, in the example of FIG. 26, it is assumed that the uniform resource locator (URL) of the protected information storing unit 400A is notified to the form generating unit 139. For example, when accepting operation of selection of the input field 231, the form generating unit 139 refers to the notified URL and accesses the protected information storing unit 400A.

Figure 27:
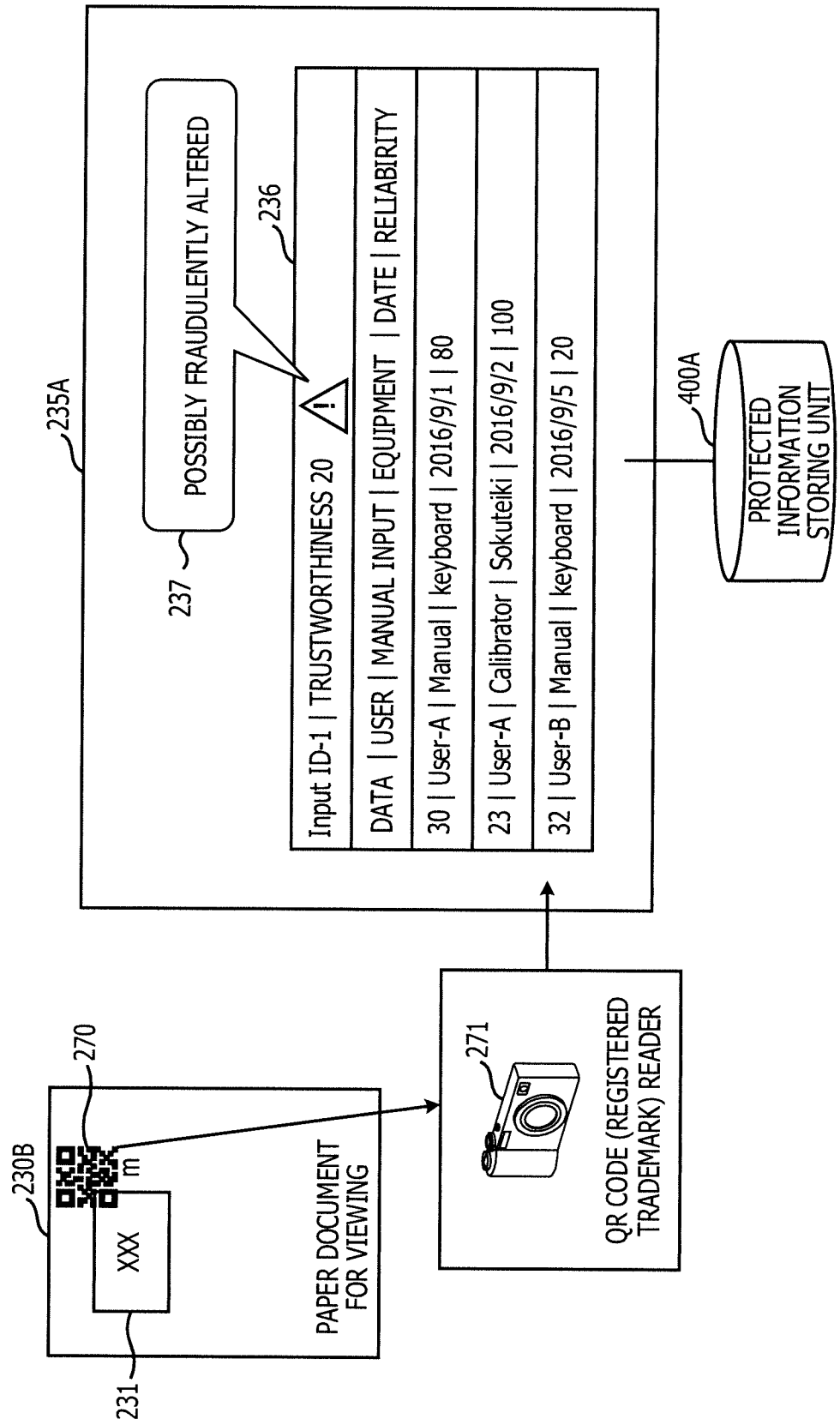
FIG. 27 is a second diagram illustrating an example in which a viewed screen of the second embodiment is displayed.

FIG. 27 is a second diagram illustrating an example in which a viewed screen of the second embodiment is displayed. The viewed screen 230B illustrated in FIG. 27 is displayed as a print preview screen, for example.

In the viewed screen 230B, a display part 270 associated with the input field 231 is displayed. In the example of FIG. 27, the display part 270 is a QR Code® that represents the URL of the protected information storing unit 400A in which data input to the input field 231 is stored.

Therefore, when the viewed screen 230B is printed, a form in which the QR code (display part) 270 is printed near the input field 231 is output.

In this case, for example, by reading the QR code 270 printed in the form by a QR code reader 271 possessed by the terminal apparatus 100A or the like, the verification window 235A including the table 236 that represents the history of input of data to the input field 231 may be displayed.

Note that, in the example of FIG. 27, it is assumed that the URL of the protected information storing unit 400A is notified to the form generating unit 139 in advance.

Next, the protected information storing unit 400A of the present embodiment will be described. Protected information stored in the protected information storing unit 400A of the present embodiment may include information such as the URL of the protected information storing unit 400A.

The protected information storing unit 400A of the present embodiment and protected information will be described below. FIG. 28 is a diagram for explaining protected information of the second embodiment. Note that, in FIG. 28, an example of protected information when data is input from the utilization equipment 200 to the terminal apparatus 100A is represented.

Protected information 280 of the present embodiment includes the identifier 71-1 for identifying the protected information, the data 71-2 that is input, the equipment descriptor 71-3 of the utilization equipment 200, the input field descriptor 71-4 to identify the input field, and the trustworthiness 71-5.

Furthermore, the protected information 280 of the present embodiment includes an application identifier 280-1, a terminal identifier 280-2, acquisition date and time 280-3, an acquisition place 280-4, and a URL 280-5.

The application identifier 280-1 represents the identifier of the form program 110 and indicates which form program 110 has been used for input of the relevant data when the data is made to correspond to plural versions or plural kinds of form programs 110. The application identifier 280-1 is written when information of the protected information output unit 137A is output to the protected information storing unit 400A.

The terminal identifier 206-2 is the identifier of the terminal apparatus 100A to which the data has been input. The acquisition date and time 280-3 indicates the date and time when the data has been acquired. The acquisition place 280-4 indicates the location of the terminal apparatus 100A when the data has been input. The location of the terminal apparatus 100A may be represented by the latitude and longitude that represent the location of the terminal apparatus 100A or may be represented by the name or the like of the room in which the terminal apparatus 100A exists, for example. For example, the acquisition place 280-4 indicates the place at which the data has been input to the terminal apparatus 100A. The URL 280-5 indicates the storage destination of the protected information storing unit 400A.

FIG. 29 is a diagram illustrating one example of a protected information storing unit of the second embodiment. In the protected information storing unit 400A illustrated in FIG. 29, information is stored as protected information in which information output from the protected information output unit 137A is associated with the trustworthiness output from the trustworthiness calculating unit 136.

The protected information of the present embodiment includes an identifier (ID) of the information, an input field descriptor, an equipment descriptor, an application identifier, data that is input, an acquisition place, acquisition date and time, a URL, and trustworthiness as items of the information as illustrated in FIG. 28.

As described above, in the present embodiment, data stored in the protected information storing unit 400A may be utilized as big data by providing the protected information storing unit 400A in the external server apparatus 900.

Third Embodiment

A third embodiment will be described below with reference to a drawing. The third embodiment is different from the first embodiment in that the equipment control embedding unit embeds functions of the trustworthiness calculating unit, the protected information output unit, and the protection area generating unit in the driver for equipment input. Thus, in the following description of the third embodiment, only the difference from the first embodiment will be described and what has similar functional configuration as the first embodiment is given similar numeral as the numeral used in the description of the first embodiment and description thereof is omitted.

Figure 30:
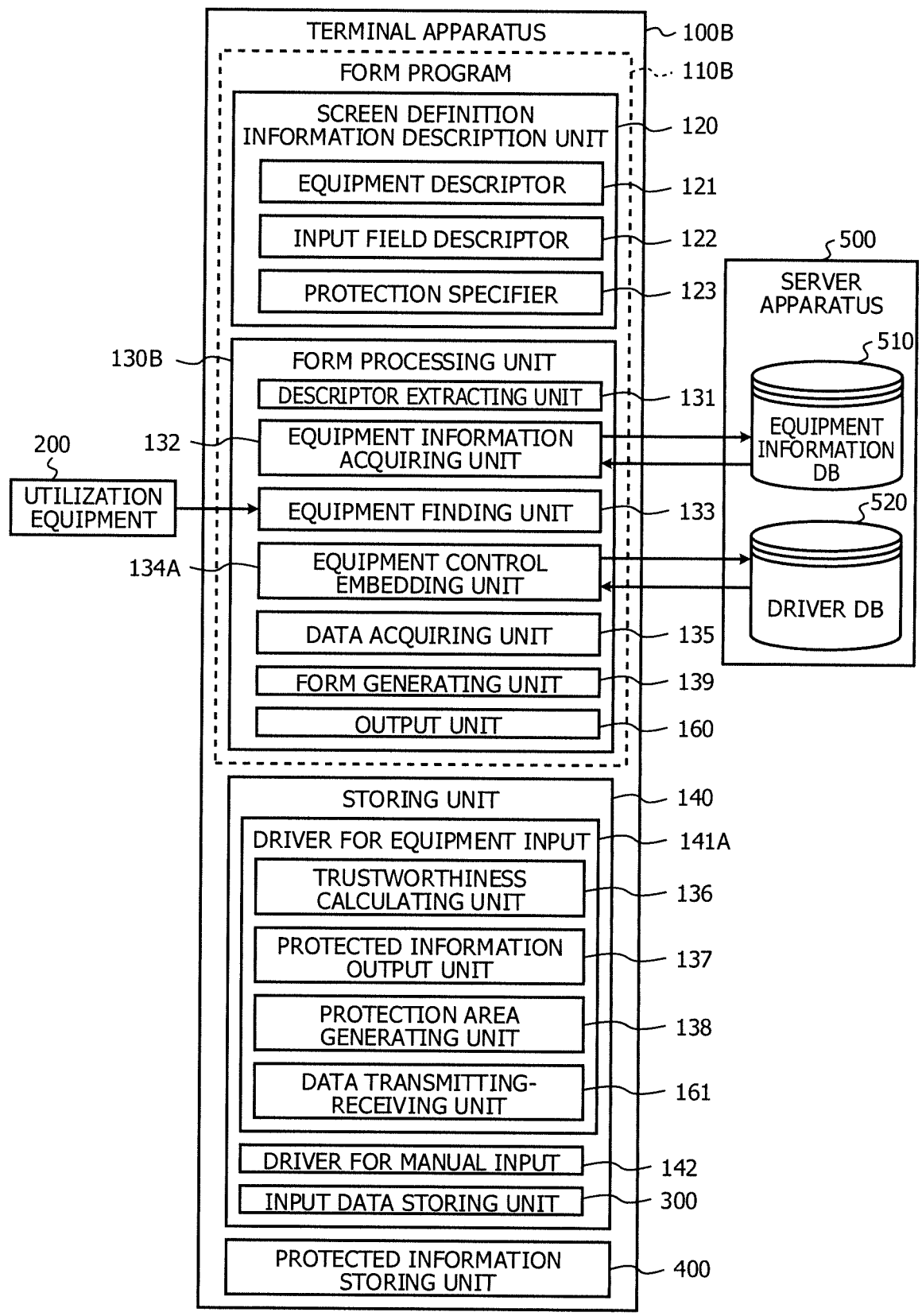
FIG. 30 is a diagram for explaining functions of a terminal apparatus of a third embodiment.

FIG. 30 is a diagram for explaining functions of a terminal apparatus of the third embodiment. A terminal apparatus 100B of the present embodiment includes a form program 110B. The form program 110B is stored in a memory of the terminal apparatus 100B and is executed by a processor of the terminal apparatus 100b to implement a form processing unit 130B. For example, the processor of the terminal apparatus 100B executes the form program 110B stored in the memory and thereby is converted to a hardware circuit (referred to also as device) that executes processing relating to the form processing unit 130B.

The form processing unit 130b of the present embodiment includes the descriptor extracting unit 131, the equipment information acquiring unit 132, the equipment finding unit 133, an equipment control embedding unit 134A, the data acquiring unit 135, the form generating unit 139, and the output unit 160.

If data is deemed as a protection subject in the screen definition information, the equipment control embedding unit 134A of the present embodiment acquires a driver corresponding to the utilization equipment 200 from the driver database 520 and embeds the driver in the terminal apparatus 100B as a driver 141A for equipment input.

At this time, the equipment control embedding unit 134A of the present embodiment also embeds functions of the trustworthiness calculating unit 136, the protected information output unit 137, the protection area generating unit 138, and a data transmitting-receiving unit 161 in the driver acquired from the driver database 520.

The data transmitting-receiving unit 161 of the present embodiment transmits data from the driver 141A for equipment input to the form processing unit 130b and receives information for identification of data from the form processing unit 130B to the driver 141A for equipment input.

For example, the equipment control embedding unit 134A acquires a description individually corresponding to the trustworthiness calculating unit 136, the protected information output unit 137, the protection area generating unit 138, and the data transmitting-receiving unit 161 from the driver database 520 and embeds the description in the driver. Then, the equipment control embedding unit 134A embeds the driver in which functions of the respective units are embedded in the terminal apparatus 100B as the driver 141A for equipment input.

In the present embodiment, as described above, input and output of data to and from the protected information storing unit 400 are carried out on the side of the driver 141A for equipment input.

This may separate the areas of operation in processing relating to the protected information storing unit 400 and processing by the form processing unit 130B individually. For example, in the present embodiment, protected information stored in the protected information storing unit 400 is managed in an area that is not operated from the form program 110B. Further, for example, the processor of the terminal apparatus 100B executes the driver 141A for equipment input embedded in the processing relating to the protected information storing unit 400 and thereby is converted to a hardware circuit that executes the processing relating to the protected information storing unit 400. Furthermore, for example, the processor of the terminal apparatus 100B executes the form program 110B and thereby is converted to a hardware circuit (referred to also as form processing device) that executes the processing by the form processing unit 130B.

Thus, according to the present embodiment, addition of unintentional change to the protected information storing unit 400 may be suppressed by the form program 110B.

Note that, in the example of FIG. 30, the trustworthiness calculating unit 136, the protected information output unit 137, the protection area generating unit 138, and the data transmitting-receiving unit 161 are possessed by the driver 141A for equipment input. However, the configuration is not limited thereto. In the present embodiment, the driver 142 for manual input may be allowed to have the trustworthiness calculating unit 136, the protected information output unit 137, the protection area generating unit 138, and the data transmitting-receiving unit 161. In this case, when embedding the above-described respective units in the driver 141A for equipment input, the equipment control embedding unit 134A may embed the above-described respective units also in the driver 142 for manual input similarly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for information processing, the apparatus comprising:
 a memory; and
 a processor coupled to the memory and configured to:
 execute a first display process that includes
  outputting a first graphical user interface in a screen of a display device by using first screen definition information, the first screen definition information indicating a configuration of the first graphical user interface, the first graphical user interface including one or more of input fields, each of the one or more of input fields being associated with an input field descriptor used to identify the each of the one or more of input fields, at least any one of the one or more of input fields being associated with an equipment descriptor used to identify a corresponding equipment configured to input data into the at least any one of the one or more of input fields;
 execute, for each of the one or more of input fields, an embedding process that includes
  performing a first embedding processing when the each of the one or more of input fields has the associated equipment descriptor, the first embedding processing being configured to
   find the corresponding equipment by using the associated equipment descriptor, and
   dynamically embed an equipment control module in response to the finding of the corresponding equipment, the equipment control module being configured to communicate with the corresponding equipment, and
  performing a second embedding processing when the each of the one or more of input fields does not have the associated equipment descriptor, the second embedding processing being configured to
   dynamically embed an input module configured to obtain data from the each of the one or more of input fields;
 execute, for each of the one or more of input fields, a data acquisition process that includes
  when the each of the one or more of input fields has the associated equipment descriptor, acquiring data input from the corresponding equipment by using the equipment control module, the acquired data being used as input data for the each of the one or more of input fields, and
  when the each of the one or more of input fields does not have the associated equipment descriptor, acquiring the input data from the each of the one or more of input fields by using the input module;
 execute, for each of the one or more of input fields, an information storing process that includes
  storing first data in a first storage area, the first data being derived from the input data, the first data stored in the first storage area being in a state where the first data is not encrypted and is associated with the input field descriptor corresponding to the each of the one or more of input fields, and
  when the each of the one or more of input fields has the associated equipment descriptor, appending the associated equipment descriptor to the first data stored in the first storage area,
  when the each of the one or more of input fields has the associated equipment descriptor, storing second data in a second storage area after encrypting the second data using a predetermined key, the second data being derived from the input data, the second data stored in the second storage area being in a state where the second data is encrypted by the predetermined key, the storing of the second data being configured to append the associated equipment descriptor and the input field descriptor to the second data stored in the second storage area; and
 execute a second display process that includes
  outputting a second graphical user interface in the screen of the display device by using second screen definition information, the second screen definition information indicating a configuration of the second graphical user interface, the second graphical user interface including at least any one of the one or more of input fields,
 wherein the outputting of the second graphical user interface is configured to
 obtain the first data from the first storage area by using the input field descriptor corresponding to the at least any one of the one or more of input fields included in the second screen definition information, display the obtained first data in the at least any one of the one or more of input fields, and perform control processing when the obtained first data is associated with the equipment descriptor, the control processing including obtaining the second data from the second storage area by using the input filed descriptor corresponding to the at least any one of the one or more of input fields, the obtained second data being in a state where the second data is decrypted by using the predetermined key, obtaining a comparison result by comparing the obtained first data with the obtained second data, and displaying, in association with the displayed first data, a predetermined mark and the comparison result, the predetermined mark being a mark indicating that the displayed first data is based on the input data obtained from the corresponding equipment.

2. The apparatus according to claim 1,
wherein the processor is configured to execute trustworthiness calculation processing that includes
acquiring a first descriptor that is the input field descriptor described in the screen definition information and input data that is data input to the input field that is an input field displayed in the form screen and corresponds to the first descriptor, and
calculating trustworthiness relating to the acquired input data, and
wherein the trustworthiness calculation processing that includes
calculating the trustworthiness relating to the input data based on hardware type information that represents trustworthiness relating to hardware of the equipment, software type information that represents trustworthiness relating to the equipment control module, and user type information that represents trustworthiness relating to a user of the equipment, and
associating the trustworthiness with the input field descriptor that corresponds with the first descriptor and storing the trustworthiness in the second storage area.

3. The apparatus according to claim 2,
wherein the processor is configured to execute form generation processing that includes receiving a request for display of an electronic form and displaying the electronic form, and
wherein the form generation processing includes
extracting the input field descriptor to identify an input field from the screen definition information, and
displaying data associated with the input field descriptor in the second storage area in the input field of the form screen.

4. The apparatus according to claim 3,
wherein the form generation processing
displays a first display part indicating that the data displayed in the input field is data acquired from the equipment in the form screen when an equipment descriptor to identify the equipment is included in the screen definition information.

5. The apparatus according to claim 3,
wherein the form generation processing
displays a second display part that is associated with the input field and indicates that trustworthiness associated with the input field descriptor in the second storage area is low in the form screen when the trustworthiness is lower than a given threshold.

6. The apparatus according to claim 5,
wherein the form generation processing
displays a list of data associated with the input field descriptor in the second storage area when the second display part is selected.

7. The apparatus according to claim 6,
wherein the list
includes the data associated with the input field descriptor, trustworthiness of the data, and information indicating whether or not the data is data acquired from the equipment.

8. The apparatus according to claim 3,
wherein the equipment control embedding processing
determines whether or not an equipment descriptor to identify the equipment is included in the screen definition information and finds the equipment based on the equipment information if the equipment descriptor is included.

9. A system for information processing, the system comprising:
an information processing apparatus; and
a server apparatus,
wherein the server apparatus includes
a memory configured to store an equipment control module, and
wherein the information processing apparatus includes
a memory, and
a processor coupled to the memory and configured to
execute a first display process that includes
outputting a first graphical user interface in a screen of a display device by using first screen definition information, the first screen definition information indicating a configuration of the first graphical user interface, the first graphical user interface including one or more of input fields, each of the one or more of input fields being associated with an input field descriptor used to identify the each of the one or more of input fields, at least any one of the one or more of input fields being associated with an equipment descriptor used to identify a corresponding equipment configured to input data into the at least any one of the one or more of input fields;
execute, for each of the one or more of input fields, an embedding processing that includes
performing a first embedding processing when the each of the one or more of input fields has the associated equipment descriptor, the first embedding processing being configured to
find the corresponding equipment by using the associated equipment descriptor, and
dynamically embed an equipment control module in response to the finding of the corresponding equipment, the equipment control module being configured to communicate with the corresponding equipment, and
performing a second embedding processing when the each of the one or more of input fields does not have the associated equipment descriptor, the second embedding processing being configured to
dynamically embed an input module configured to obtain data from the each of the one or more of input fields;
execute, for each of the one or more of input fields, a data acquisition processing that includes
when the each of the one or more of input fields has the associated equipment descriptor, acquiring data input from the corresponding equipment by using the equipment control module, the acquired data being used as input data for each of the one or more of the input fields, and when the each of the one or more of input fields does not have the associated equipment descriptor, acquiring the input data from the each of the one or more of input fields by using the input module;

execute, for each of the one or more of input fields, an information storing output processing that includes storing first data in a first storage area, the first data being derived from the input data, the first data stored in the first storage area being in a state where the first data is not encrypted and is associated with the input field descriptor corresponding to the each of the one or more of input fields, and when the each of the one or more of input fields has the associated equipment descriptor, appending the associated equipment descriptor to the first data stored in the first storage area, when the each of the one or more of input fields has the associated equipment descriptor, storing second data in a second storage area after encrypting the second data using a predetermined key, the second data being derived from the input data, the second data stored in the second storage area being in a state where the second data is encrypted by the predetermined key, the storing of the second data being configured to append the associated equipment descriptor and the input field descriptor to the second data stored in the second storage area; and execute a second display process that includes outputting a second graphical user interface in the screen of the display device by using second screen definition information, the second screen definition information indicating a configuration of the second graphical user interface, the second graphical user interface including at least any one of the one or more of input fields, wherein the outputting of the second graphical user interface is configured to obtain the first data from the first storage area by using the input field descriptor corresponding to the at least any one of the one or more of input fields included in the second screen definition information, display the obtained first data in the at least any one of the one or more of input fields, and perform control processing when the obtained first data is associated with the equipment descriptor, the control processing including obtaining the second data from the second storage area by using the input filed descriptor corresponding to the at least any one of the one or more of input fields, the obtained second data being in a state where the second data is decrypted by using the predetermined key, obtaining a comparison result by comparing the obtained first data with the obtained second data, and displaying, in association with the displayed first data, a predetermined mark and the comparison result, the predetermined mark being a mark indicating that the displayed first data is based on the input data obtained from the corresponding equipment.

10. The system according to claim 9, wherein the memory included in the server apparatus has the second storage area, and wherein the output processing includes associating the data acquired from the equipment with the input field descriptor to identify the input field and storing the data in the first storage area, and associating the data acquired from the equipment with the input field descriptor to identify the input field and transmitting the data to the server apparatus to store the data acquired from the equipment and the input field descriptor in association with each other in the second storage area in the server apparatus.

11. An apparatus for information processing, the apparatus comprising:

a memory; and a processor coupled to the memory and configured to execute a reception processing that includes receiving one or more pieces of input data from form processing device configured to execute a first display process that includes outputting a first graphical user interface in a screen of a display device by using first screen definition information, the first screen definition information indicating a configuration of the first graphical user interface, the first graphical user interface including one or more of input fields, each of the one or more of input fields being associated with an input field descriptor used to identify the each of the one or more of input fields, at least any one of the one or more of input fields being associated with an equipment descriptor used to identify a corresponding equipment configured to input data into the at least any one of the one or more of input fields, each of the received one or more pieces of input data being data that has been inputted to a corresponding input field from among the one or more of input fields, and execute, for each of the received one or more pieces of input data, an information storing processing that includes storing first data in a first storage area, the first data being derived from the respective input data, the first data stored in the first storage area being in a state where the first data is not encrypted and is associated with the input field descriptor corresponding to the corresponding input field from among the one or more of input fields, and when the corresponding input field has an associated equipment descriptor, appending the associated equipment descriptor to the first data stored in the first storage area, when the each of the one or more of input fields has the associated equipment descriptor, storing second data in a second storage area after encrypting the second data using a predetermined key, the second data being derived from the respective input data, the second data stored in the second storage area being in a state where the second data is encrypted by the predetermined key, the storing of the second data being configured to append the associated equipment descriptor and the input field descriptor to the second data stored in the second storage area, and execute a transmission processing in response to a request from the form processing device configured to execute a second display process that includes outputting a second graphical user interface in the screen of the display device by using second screen definition information, the second screen definition information indicating a configuration of the second graphical user interface, the second graphical user interface including at least any one of the one or more of input fields, the transmission processing configured to obtain the first data from the first storage area by using the input field descriptor corresponding to the at least any one of the one or more of input fields include in the second graphical user interface, when the obtained first data is associated with the equipment descriptor, obtain the second data from the second storage area by using the input filed descriptor corresponding to the at least any one of the one or more of input fields, the obtained second data being in a state where the second data is decrypted by using the predetermined key, transmit a response signal including the obtained first data and the obtained second data to the form processing device to cause the form information device to execute a second display process, the second display process including displaying the obtained first data in the corresponding input field from among the one or more of input fields included in the second graphical user interface, displaying, in association with the displayed first data, a predetermined mark and a comparison result, the predetermined mark being a mark indicating that the displayed first data is based on the input data obtained from the corresponding equipment, the comparison result being obtained by comparing the first data with the second data.

\* \* \* \* \*